US011379529B2

(12) United States Patent
Fenton et al.

(10) Patent No.: US 11,379,529 B2
(45) Date of Patent: Jul. 5, 2022

(54) COMPOSING RICH CONTENT MESSAGES

(71) Applicant: MICROSOFT TECHNOLOGY LICENSING, LLC, Redmond, WA (US)

(72) Inventors: Robert Ross Fenton, Seattle, WA (US); John Alton Price, Seattle, WA (US); Carol Kumar Mekala, Woodinville, WA (US); Richard Scott Cassan, Seattle, WA (US); Hany Salaheldeen Khalil, Mountlake Terrace, WA (US); Subramanian Vuttravadium Venkata, Redmond, WA (US); Malik M. Pradhan, Kirkland, WA (US); Alfredo Augusto Menendez Sancho, Redmond, WA (US); Jacqueline Kay Killow, Bellevue, WA (US); Anuja Milind Joshi, Bellevue, WA (US); Jacob G. Danovitch-Tatoff, Ottawa (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 180 days.

(21) Appl. No.: 16/564,612

(22) Filed: Sep. 9, 2019

(65) Prior Publication Data
US 2021/0073293 A1   Mar. 11, 2021

(51) Int. Cl.
*G06F 16/9032* (2019.01)
*G06N 20/00* (2019.01)
*H04L 51/046* (2022.01)

(52) U.S. Cl.
CPC ....... *G06F 16/90332* (2019.01); *G06N 20/00* (2019.01); *H04L 51/046* (2013.01)

(58) Field of Classification Search
None
See application file for complete search history.

(56) References Cited

U.S. PATENT DOCUMENTS 8,396,719 B2   3/2013  Patrick et al.
9,015,099 B2 * 4/2015  Nitz ...................... G06N 5/048
                                                   706/46

(Continued)

FOREIGN PATENT DOCUMENTS

EP          3122001 A1    1/2017

OTHER PUBLICATIONS

"Final Office Action Issued in U.S. Appl. No. 15/435,637", dated Sep. 17, 2019, 18 Pages.

(Continued)

*Primary Examiner* — Antim G Shah
(74) *Attorney, Agent, or Firm* — Shook, Hardy & Bacon, LLP

(57) ABSTRACT

Technology is disclosed for proactively enriching content of electronic communications through predicting user intents. User-composed content within an electronic communication is observed and used to predict one or more intents each associated with a task related to the communication and to be completed in creating the communication. Task-queries may be generated based on the detected intents and entities extracted from the user-composed content, contextual information, or other information related to the user, such as a user-knowledge database. User selection of a suggested task-query automatically executes the task-query, and the results are provided to the user. Each result may include an action involving adding content to or supplementing the content of the electronic communication. A conversational digital assistant may further be invoked to interact with the (Continued)

user to confirm and/or modify suggested task-queries and results of selected task-queries.

15 Claims, 13 Drawing Sheets

(56) References Cited

U.S. PATENT DOCUMENTS

| | | | |
|---|---|---|---|
| 9,754,016 B1* | 9/2017 | Bozarth | G10L 15/26 |
| 9,977,595 B2 | 5/2018 | Choi | |
| 10,043,516 B2 | 8/2018 | Saddler et al. | |
| 10,108,612 B2 | 10/2018 | Lee et al. | |
| 2008/0201434 A1 | 8/2008 | Holmes et al. | |
| 2009/0235280 A1 | 9/2009 | Tannier et al. | |
| 2009/0254624 A1 | 10/2009 | Baudin et al. | |
| 2012/0290662 A1* | 11/2012 | Weber | G06F 16/2465 |
| | | | 709/206 |
| 2013/0110520 A1 | 5/2013 | Cheyer et al. | |
| 2013/0297317 A1 | 11/2013 | Lee et al. | |
| 2014/0181219 A1* | 6/2014 | Wang | G06F 9/453 |
| | | | 709/206 |
| 2014/0214404 A1 | 7/2014 | Kalia et al. | |
| 2015/0161291 A1* | 6/2015 | Gur | G06F 16/904 |
| | | | 707/722 |
| 2016/0182709 A1 | 6/2016 | Kim et al. | |
| 2016/0301639 A1 | 10/2016 | Liu et al. | |
| 2016/0308794 A1 | 10/2016 | Kim et al. | |
| 2016/0321283 A1 | 11/2016 | Shen et al. | |
| 2016/0321573 A1 | 11/2016 | Vangala et al. | |
| 2016/0335572 A1* | 11/2016 | Bennett | G06Q 10/06311 |
| 2016/0337295 A1 | 11/2016 | Bennett et al. | |
| 2017/0308291 A1 | 10/2017 | Luipold | |
| 2017/0336958 A1 | 11/2017 | Chaudhri et al. | |
| 2018/0083894 A1* | 3/2018 | Fung | H04L 51/046 |
| 2018/0239770 A1 | 8/2018 | Ghotbi et al. | |

OTHER PUBLICATIONS

"Non Final Office Action Issued In U.S. Appl. No. 15/435,637", dated Feb. 12, 2019, 14 Pages.

Bonnington, Christina, "The Smart Inbox Feature You Need Now", Retrieved From: http://web.archive.org/web/20151107021400/http://www.refinery29.com/2015/11/96913/inbox-smart-reply-feature, Nov. 3, 2015, 2 Pages.

Hidinger, et al., "Here's how to render a card using the JavaScript SDK", Retrieved from: https://docs.microsoft.com/en-us/adaptive-cards/sdk/rendering-cards/javascript/render-a-card, Nov. 28, 2017, 3 Pages.

Katamreddy, Srudeep, "How smart is Google Allo? Googie's new smart messaging app", Retrieved From: https://techtrendan.com/google-allo-app/, 2015, 11 Pages.

"International Search Report and Written Opinion Issued in PCT Application No. PCT/US18/017145", dated Mar. 26, 2018, 13 Pages.

Roger, Fingas, "Inside iOS 10: Upgraded QuickType wields 'Siri intelligence' for contextual Suggestions", Retrived from: https://appleinsider.com/articles/16/06/15/inside-ios-10-upgraded-quicktype-wields-siri-intelligence-for-contextual-suggestions, Jun. 15, 2016, 10 Pages.

Gysel, et al., "Reply With: Proactive Recommendation of Email Attachments", In Repository of arXiv:1710.06061v2, Nov. 16, 2017, 10 Pages.

"International Search Report and Written Opinion Issued in PCT Application No. PCT/US20/038009", dated Sep. 25, 2020, 14 Pages.

"Office Action Issued in European Patent Application No. 18706359.9", dated May 12, 2020, 8 Pages.

"Non Final Office Action Issued in U.S. Appl. No. 15/435,637", dated May 11, 2021, 20 Pages.

"Office Action Issued in Indian Patent Application No. 201917032633", dated Jan. 6, 2022, 7 Pages.

\* cited by examiner

FIG. 4C

COMPOSING RICH CONTENT MESSAGES

BACKGROUND

Computer systems allow users to enrich electronic communications (such as emails and chat messages) by adding content (e.g., images, links, or other content) that supplements the textual content of the electronic communications. Creating such enriched content often involves completing one or more tasks aside from authoring the textual content. For example, when sending an email, a user may also wish to attach a file, add an image, add a hyperlink, or schedule a meeting relating to the email. These tasks may have a large cognitive "fan out" such that the overhead of attending to these tasks during composition of the message often causes the user to lose track of the immediate task of composing textual content (e.g., writing the body of an email). Conventional communication applications lack the functionality for completing these tasks within an authoring session, thereby requiring users to leave the context of authoring content to search through an electronic file system, open a new web browser page, or engage in other tasks to complete their communication.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present disclosure enable improved computer-communications technology in which a computerized service proactively generates and suggests questions or commands (referred to herein as task-queries). In some embodiments, the computerized service comprises a digital assistant. The task-queries may be used to initiate and/or facilitate user-computer interaction with the computerized service to aid in discovery, management, and completion of a task the user intends to perform in association with the communication creation process (e.g., attaching an image, scheduling a meeting, or similar tasks described herein). The task-queries may be provided based on the content authored by the user, as well as contextual information stored in memory.

As a user naturally composes content, such as text for the body of an email, a computerized service, such as a digital assistant, passively observes what the user is creating (e.g., what the user is typing or dictating, or other user-related activity that may occur during the creation process). The in-progress content, and in some instances related contextual information, is processed and classified into one or more different task-intents representing particular tasks the user may intend to perform in order to enrich the content of the communication. These task-intents correspond to task-queries that the user may issue as questions or commands to the digital assistant in order to accomplish an intended task related to the communication.

In some embodiments, formulating task-queries from observing the user's content composition for a communication includes determining a user's likely intent(s) regarding the communication, and determining semantically sound task-queries from the detected intent(s). Using a set of classifiers, one or more task-intents may be identified from the content (such as textual or voice content) composed by the user. In some instances, each classifier may be trained to detect one or more particular task-intents, such as the intent to attach a file or create a calendar event, for instance.

Determining semantically sound task-queries from the task-intents includes identifying candidate task-queries associated with the detected intent(s) and extracting entities (e.g., people, places, objects, events, or the like, as further described herein) associated with the user's intent. Entities may be extracted from the observed user-composed content as well as, in some embodiments, contextual information and other information related to the user in a user-knowledge database. A combination of language generation models, previously successful user queries submitted to the digital assistant, rules, conditions, and/or other semantic logic may be used in generating the task-queries. In some embodiments, the task-queries are ranked or ordered according to one or more confidence scores and/or using a promotion model before being provided to the user. In this way, only those formulated task-queries having a higher confidence score or otherwise determined to be relevant to the user (or accurate) may be provided to the user.

After task-queries are provided to the user, the user may select a particular task-query, which may be provided to the computerized service (e.g., digital assistant) for further processing. In an example embodiment, for instance, a digital assistant may utilize the task-query to identify a skill, or logic, associated with the selected task-query to determine and provide to the user one or more task-query results corresponding to the selected task-query.

Each result may comprise enriched content, such as an image, presentation, multimedia, a set of objects, organized or graphical data, or other content, and a user's selection of a result may automatically initiate operations to incorporate the enriched content into the electronic communication. For instance, selection of a file provided by a selected task-query may automatically initiate operations for attaching the selected file to the electronic communication, without requiring user navigation of a file system or suspension of user action within the email client application. The content of the selected result(s) may be formatted to be readily usable within different communication applications such that the incorporated content retains the look of the underlying result once it is integrated into the electronic communication. Alternatively or additionally, the content of the selected result(s) may be modified to match the formatting of a particular communication application used to compose the communication.

Further, embodiments of the present disclosure include providing a user interface for facilitating a dialog with a computerized service (e.g., a digital assistant comprising a conversational assistant) to confirm, refine, and/or modify task-queries. For example, after selection of a task-query, a user interface may appear to facilitate user interaction with a conversational assistant to confirm the task-query or the task-query results, to request additional details from the user to complete the task-query, and/or to allow user modification of the task-query or user requests for additional task-queries.

BRIEF DESCRIPTION OF THE DRAWINGS

Aspects of the disclosure are described in detail below with reference to the attached drawing figures, wherein:

FIGS. 4A-C illustratively depict exemplary screenshots from a personal computing device showing aspects of an example graphical user interface, in accordance with an embodiment of the present disclosure;

DETAILED DESCRIPTION

Figure 1:
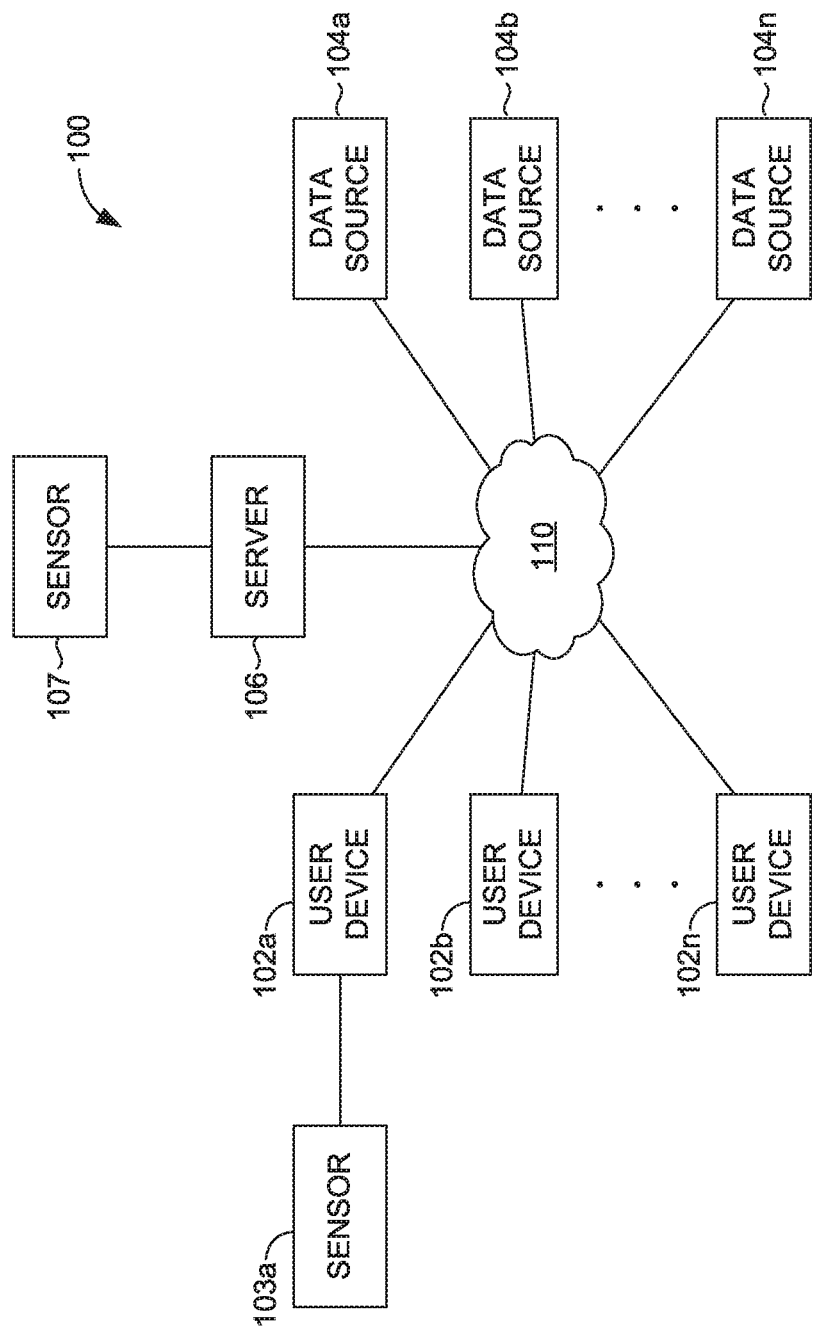
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-useable instructions stored on computer storage media. The methods may be provided by a stand-alone application, a service or hosted service (stand-alone or in combination with another hosted service), or a plug-in to another product, to name a few.

Aspects of the present disclosure relate to technology for enriching user-authored content through actionable context-based suggestions. Computer systems allow users to enrich electronic communications (such as emails and chat messages) that supplements the textual content of the electronic communications. Creating such enriched content often involves completing one or more tasks aside from authoring the textual content. For example, when sending an email, a user may also wish to attach a file, add an image, add a hyperlink, or schedule a meeting relating to the email. These tasks may have a large cognitive "fan out" such that the overhead of attending to these tasks during composition of the message often causes the user to lose track of the immediate task of composing textual content (e.g., writing the body of an email). Conventional communication applications lack the functionality for completing these tasks within an authoring session, thereby requiring users to leave the context of authoring content to search through an electronic file system, open a new web browser page, or engage in other tasks to complete the composition of enriched content.

To reduce this overhead and streamline the enrichment of user-created content, embodiments of the present disclosure enable improved computer-communications technology in which a computerized service (e.g., a digital assistant), which may be integrated with a client communication application, proactively generates and suggests questions or commands (referred to herein as task-queries). The task-queries may be used to initiate and/or facilitate user-computer interaction with the computerized service (e.g., digital assistant) in order to aid in discovery, management, and completion of a task the user intends to perform in association with the communication creation process (e.g., attaching an image, scheduling a meeting, or similar tasks described herein). In some embodiments of the user-computer interaction, the digital assistant may comprise a conversational assistant, as further described herein. The task-queries may be provided based on the content being composed by the user, as well as contextual information stored in memory.

Figures 4A, 4B:
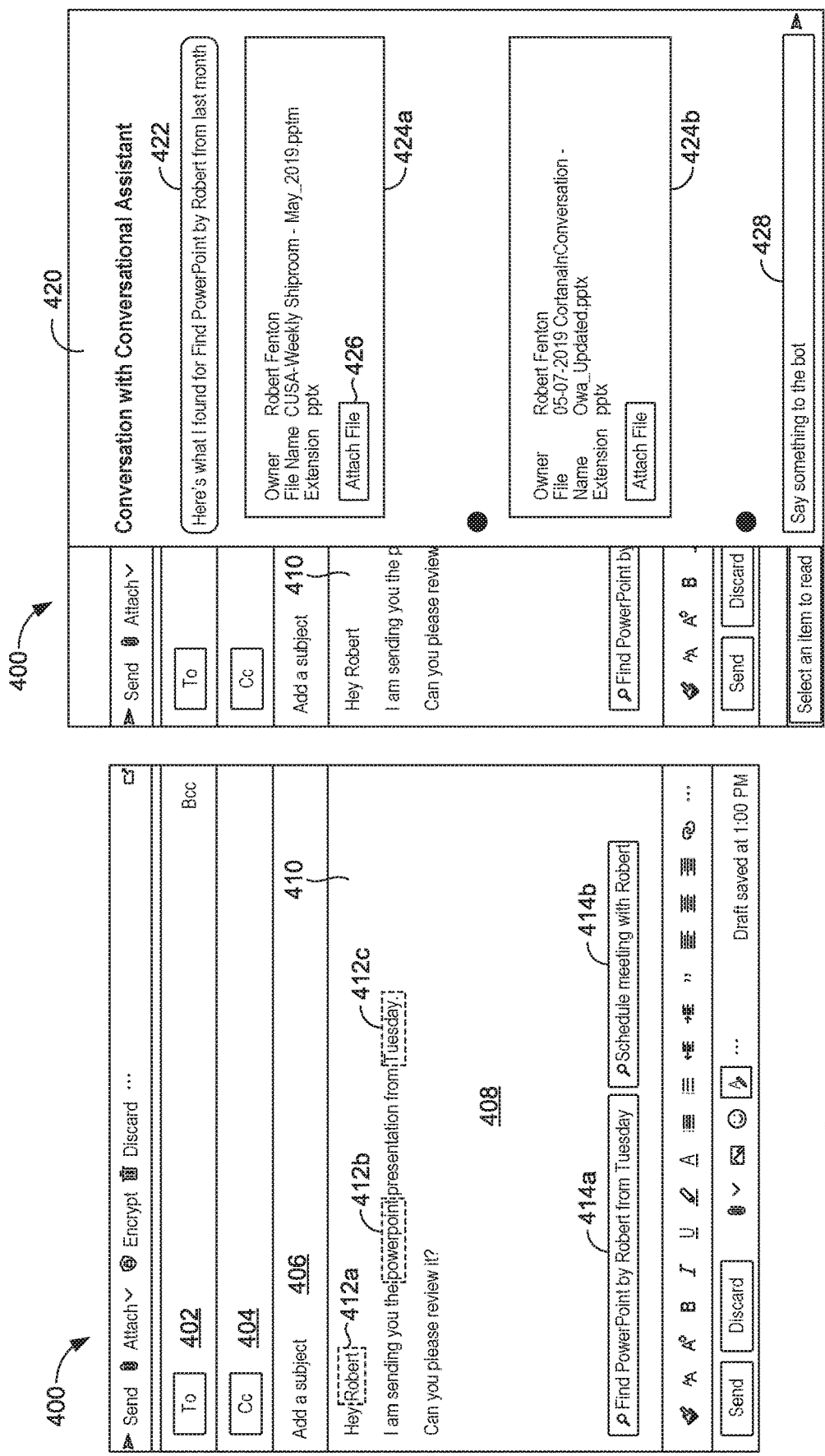

At a high level and according to some embodiments, as a user naturally composes a communication, such as an email, a digital assistant passively "listens to" or observes what the user is creating (e.g., what the user is typing or dictating), or other user-related activity that may occur during the creation process. The in-progress content, and in some instances related contextual information, is processed and classified into one or more different task-intents representing particular tasks the user may intend to perform in order to enrich content of the communication. These task-intents correspond to task-queries that the user may issue as questions or commands to the digital assistant or computer system in order to accomplish an intended task related to the communication. In some embodiment, the task-queries are provided to the user so that one (or more) can be selected. For example, as depicted in FIG. 4A, discussed in more detailed herein, as a user types in an email body, "Hey Robert, I'm sending you the powerpoint presentation from Tuesday," a digital assistant suggests a task-query "Find PowerPoint presentation by Robert from Tuesday."

In some embodiments, formulating task-queries from observing or passive "listening" includes determining a user's likely intent(s) regarding the communication, determining entities (e.g., people, places, objects, events, or the like, as further described herein) associated with the user's intent(s), and task-query generation. Using a set of classifiers, one or more task-intents may be identified from the content (such as textual or voice content) composed by the user. In some instances, each classifier may be trained to detect one or more particular task-intents, such as the intent to attach a file or create a calendar event, for instance. In some embodiments, the classifiers may comprise machine learning models, such as deep neural networks, and may operate in parallel to one another.

Task-query generation may further involve determining semantically sound task-queries from the task-intents. Semantically sound task-queries include task-queries that may make sense to the user and that can be used to accomplish the detected task-intents as described further below. Determining semantically sound task-queries may include using a combination of language generation models, previously successful user queries submitted to the digital assistant, rules, conditions and/or other semantic logic. For example, in some embodiments, each detected intent may be associated with a set of candidate task-queries each having one or more required fields (slots) for relevant entities, such as keywords, file type, file name, contact name, date/time. Slot tagging then involves extracting information about these entities for a particular candidate task-query and identifying which entity values to include in each slot of a candidate task-query. Information about these entities used for slot tagging may be extracted from the content of the communication authored by the user and, in some aspects, contextual information, and/or other information related to the user, which may be stored in a user-knowledge database.

As such, a large set of information related to the user, which may comprise a user knowledge database, may be utilized in order to identify details of a user's intended task. In some embodiments, the user-knowledge database comprises (or its information is logically organized as) a knowledge graph, which may be traversed in order to determine details associated with a user's intended task. In this way, embodiments of the present disclosure may enable a digital assistant or computer service to more quickly traverse a large set of information by using natural language received by observing the user's composition of a communication.

Task-queries may be formulated using the candidate task-queries and the determined entities for the corresponding fields and then provided to the user. As mentioned, in some embodiments, this operation includes performing one or more semantic analyses on a candidate task-query. For example, in some instances, candidate task-queries may be processed through a semantic layer, such as described further with respect to FIG. 3A. In some embodiments, the formulated task-queries are ranked or ordered according to one or more confidence scores. Alternatively or additionally, the task-queries may be ranked using a promotion model. In this way, only those formulated task-queries having a higher confidence score or otherwise determined to be relevant to the user (or accurate) may be provided to the user, so that the user is not overwhelmed. In some embodiments, the task-queries that are suggested to the user are considered "hero" queries that have been ensured to work within a digital-assistant framework.

When the user selects a particular task-query, the task-query may be provided to a digital assistant for further processing. In an example embodiment, for instance, the digital assistant may utilize the task-query to identify a skill, or logic, associated with the selected task-query to determine and provide to the user one or more task-query results corresponding to the selected task-query. For example, for an "attach a powerpoint presentation" intent, the digital assistant may determine and execute a "file search skill." The results of running this skill may be a list of files matching the selected task-query as illustrated in FIG. 4B.

Figure 4C:
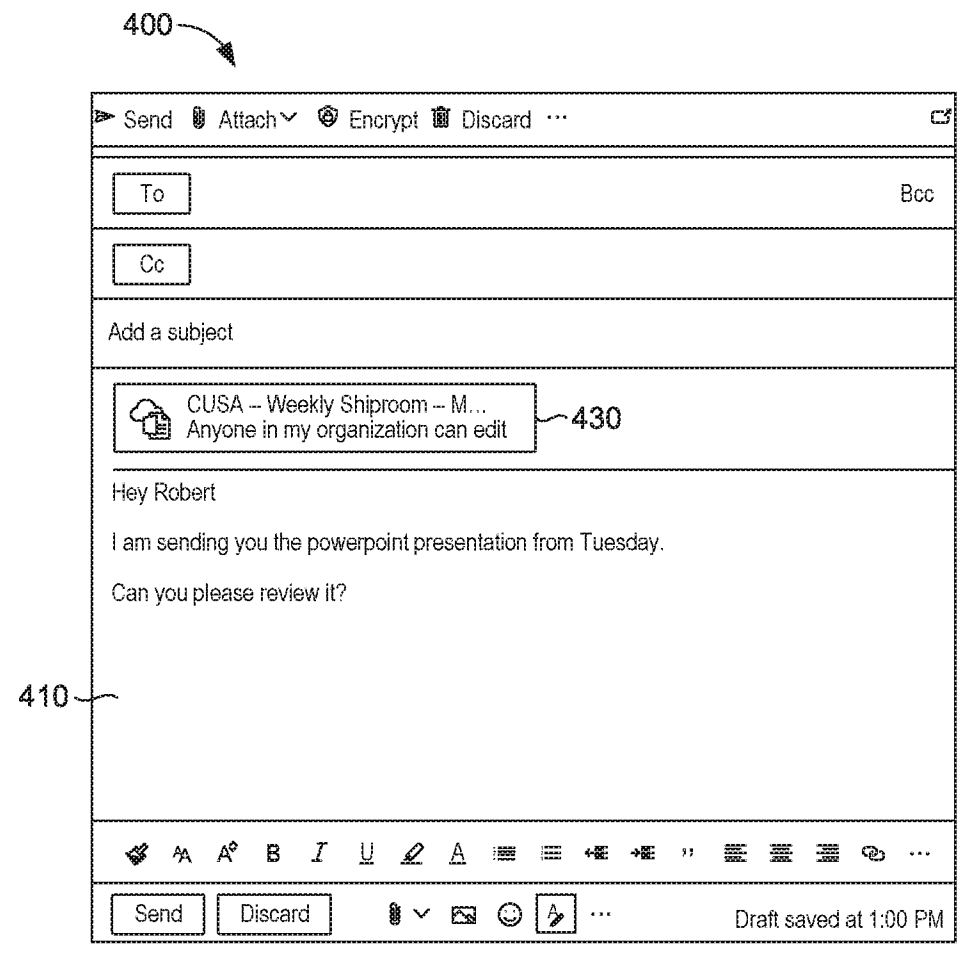

After receiving the results corresponding to a selected task-query, a user may select or otherwise confirm a particular result based on what the user believes would enrich the electronic communication in the intended manner Selection of a result may automatically initiate computer-implemented actions for completing the task without leaving the current context of authoring the content. For instance, selection of one of the PowerPoint® presentations in the results shown in FIG. 4B may automatically initiate operations for attaching the selected file to the email, as shown in FIG. 4C, without requiring user navigation of the file system or suspension of user action within the email client application. In some embodiments, the result may comprise enriched content, such as an image, presentation, multimedia, a set of objects, organized or graphical data, or other content, and the selection of the result by the user may initiate operations to incorporate the enriched content into the communication message. The content of the results may be formatted to be readily usable within different communication applications such that the incorporated content retains the look of the underlying result once it is integrated into the communication message within the user's communication application.

As a result, the user can quickly manage what tasks, such as attaching a file and/or scheduling a meeting, may be needed to achieve the intended communication content in an automated fashion. By proactively generating and suggesting task-queries through a digital assistant based on detected tasks related to the content that a user may have performed, communication content can be enriched more efficiently without leaving the context of authoring the electronic communication within the client application. Additionally, the user does not lose track of the content of the electronic communication the user is composing in order to complete these tasks.

Further, embodiments of the present disclosure include providing a user interface for facilitating a dialog with a digital assistant (and, in particular, those embodiments where the digital assistant comprises a conversational assistant) to confirm, refine, and/or modify task-queries. For example, after selection of a task-query, a user interface may appear to facilitate user interaction with a conversational assistant in order to confirm the task-query or task-query result, to request additional details from the user to complete the task-query, and/or to allow user modification of the task-query or user requests for additional task-queries. In the example from FIG. 4A described above, a user may, through the user interface depicted in FIG. 4B, modify the selected task-query of "Attach a presentation from Robert on Tuesday" to a presentation created on Thursday if, for instance, the conversational assistant indicated it could not locate a presentation from Tuesday, causing the user to realize she meant to reference a presentation from Thursday instead of Tuesday. Additionally, the user interface and dialog with the conversational assistant may enable the user to further specify that the desired presentation was created by "Robert Smith." In this way, the conversational assistant may be utilized via a multi-turn dialog to collect or otherwise determine the information needed to complete tasks associated with the electronic communication.

Among others, one benefit of described embodiments includes assisting an author of an electronic communication to quickly manage what tasks may be needed to achieve the desired content of the communication in an automated fashion. By proactively generating and suggesting task-queries through a digital assistant based on detected task-intents, communication content can be enriched more efficiently without leaving the context of authoring the electronic communication within the client application. Rather, these tasks relating to enriching the content can be passively delegated to a digital assistant or computer service in the course of composing the communication without requiring composition of the communication to be interrupted. Additionally, the digital assistant or computer service can traverse a large set of information, such as a user-knowledge database discussed herein, very quickly simply through the natural language input from user-authored content. Further, with an interactive aspect of the digital assistant (such as a conversational assistant), user-computer interactions may result in multi-turn dialogs to enable the digital assistant to collect all the information needed for enriching the content of the electronic communication.

Moreover, embodiments can suggest task-queries that are highly relevant to the context of the topic in the content of an electronic communication in a reasonable time frame. Certain task-queries may be weighted higher based on the needs of the contextual domain/platform. For instance, more meeting management-based or document search-based queries may be suggested in the context of an email being composed compared to other forms of electronic communications. Embodiments using machine learning models for particular domains and/or intents, as disclosed herein, also enable the models to be compartmentalized such that they are independent of larger suggestion systems to allow easy cross-team integration of multiple solutions. This facilitates use of the models in parallel, which decreases processing time and improves bandwidth. Additionally, new or improved upon models (as well as logic or classifiers), such as models for specific domains, intents, and task-queries, may be introduced or swapped out in a short timeframe.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user computing devices, such as user devices 102a and 102b through 102n; a number of data sources, such as data sources 104a and 104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 800 described in connection to FIG. 8, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client user devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 8 herein. By way of example and not limitation, a user device may be embodied as a personal computer (PC), a laptop computer, a mobile or mobile device, a smartphone, a smart speaker, a tablet computer, a smart watch, a wearable computer, a personal digital assistant (PDA) device, a music player or an MP3 player, a global positioning system (GPS) or device, a video player, a handheld communications device, a gaming device or system, an entertainment system, a vehicle computer system, an embedded system controller, a camera, a remote control, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100, or system 200 described in connection to FIG. 2. (For instance, in one embodiment, one or more data sources 104a through 104n provide (or make available for accessing) user data, which may include user-activity related data, to user-data collection component 210 of FIG. 2.) Data sources 104a and 104b through 104n may be discrete from user devices 102a and 102b through 102n and server 106 or may be incorporated and/or integrated into at least one of those components. In one embodiment, one or more of data sources 104a through 104n comprise one or more sensors, which may be integrated into or associated with one or more of the user device(s) 102a, 102b, or 102n or server 106. Examples of sensed user data made available by data sources 104a through 104n are described further in connection to user-data collection component 210 of FIG. 2.

Figure 2:
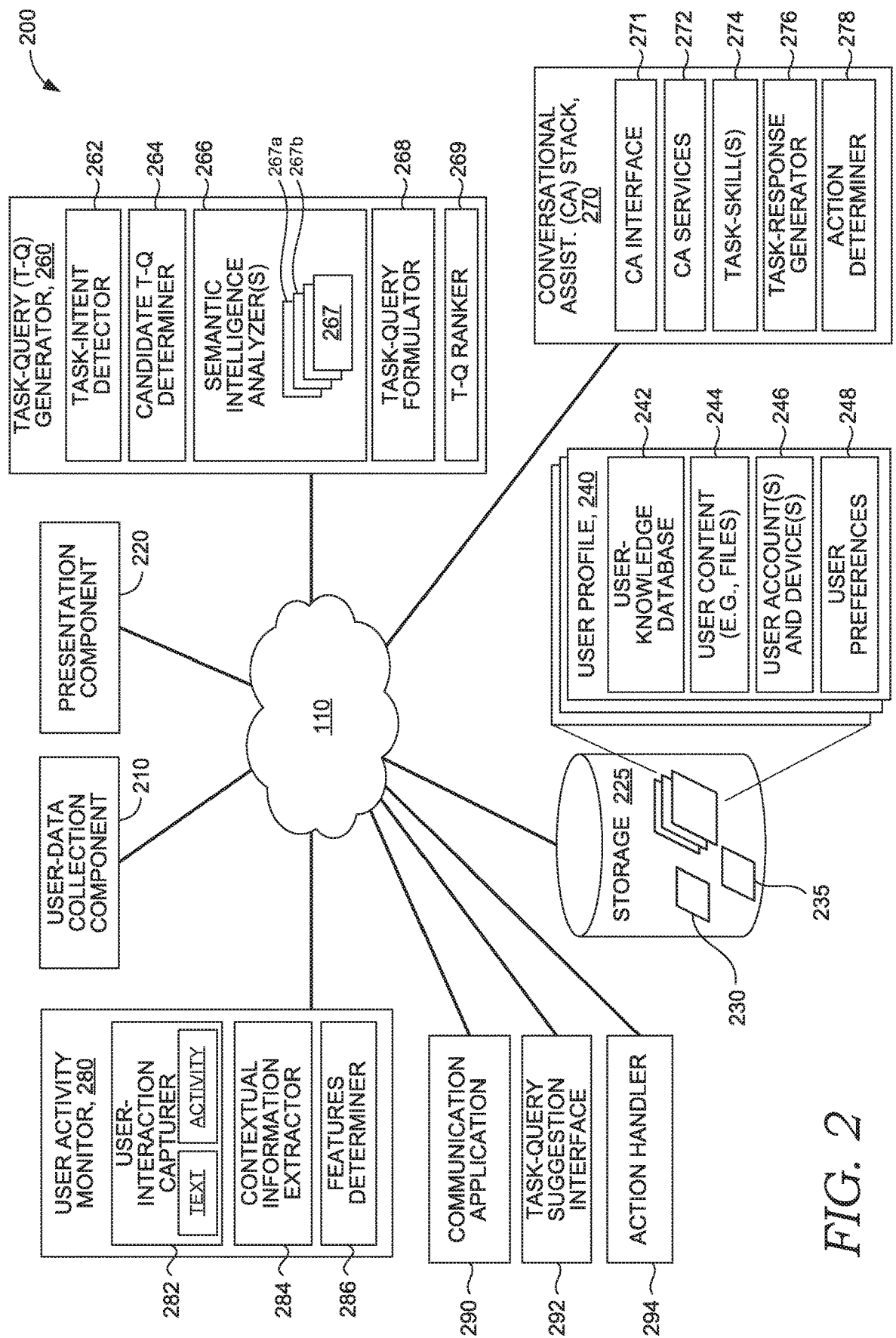
FIG. 2 is a diagram depicting an example computing architecture suitable for implementing aspects of the present disclosure.

Operating environment 100 can be utilized to implement one or more of the components of system 200, described in FIG. 2, including components for collecting user-related data; determining task-intents and generating related task-queries; and determining enriched content or supplemental information, observing user-related activity and events, user preferences, context data, or related information; integrating enriched or supplemental content into a message, and/or presenting an enhanced message display and related content to users. Operating environment 100 also can be utilized for implementing aspects of methods 600 and 700, described in FIGS. 6 and 7, respectively.

Referring now to FIG. 2 and with continuing reference to FIG. 1, a block diagram is provided showing aspects of an example computing system architecture suitable for implementing an embodiment of this disclosure and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user-data collection component 210, presentation component 220, task-query generator 260, conversational assistant stack 270, user activity monitor 280, communication application 290, task-query suggestion interface 292, action handler 294, and storage 225. One or more of these components may be embodied as a set of compiled computer instructions or functions, program modules, computer software services, or an arrangement of processes carried out on one or more computer systems, such as computing device 800 described in connection to FIG. 8, for example.

In one embodiment, the functions performed by components of system 200 are associated with one or more electronic communication applications, services, or routines (such as communication application 290) and/or one or more digital assistant applications, services, or routines, such as described in connection with conversational assistant stack 270. In particular, such applications, services, or routines may operate on one or more user devices (such as user device 102a), servers (such as server 106), may be distributed across one or more user devices and servers, or be implemented in the cloud. Moreover, in some embodiments, these components of system 200 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some embodiments functionality of these components can be shared or distributed across other components.

Continuing with FIG. 2, user-data collection component 210 is generally responsible for accessing or receiving (and in some cases also identifying) user data from one or more data sources, such as data sources 104a and 104b through 104n of FIG. 1. In some embodiments, user-data collection component 210 may be employed to facilitate the accumulation of user data of a particular user (or in some cases, a plurality of users including crowdsourced data) for user activity monitor 280. The data may be received (or accessed), and optionally accumulated, reformatted, and/or combined, by user-data collection component 210 and stored in one or more data stores such as storage 225, where it may be available to other components of system 200. For example, the user data may be stored in or associated with a user profile 240, as described herein. Additionally or alternatively, in some embodiments, any personally identifying data (i.e., user data that specifically identifies particular users) is either not uploaded or otherwise provided from the one or more data sources with user data, is not permanently stored, and/or is not made available to user activity monitor 280 or other components of system 200. In some embodiments, a user may opt into or out of services provided by the technologies described herein and/or select which user data and/or which sources of user data are to be utilized by these technologies.

User data may be received from a variety of sources where the data may be available in a variety of formats. For example, in some embodiments, user data received via user-data collection component 210 may be determined via one or more sensors (such as sensors 103a and 107 of FIG. 1), which may be on or associated with one or more user devices (such as user device 102a), servers (such as server 106), and/or other computing devices. As used herein, a sensor may include a function, routine, component, or combination thereof for sensing, detecting, or otherwise obtaining information such as user data from a data source 104a, and may be embodied as hardware, software, or both. By way of example and not limitation, user data may include data that is sensed or determined from one or more sensors (referred to herein as sensor data), such as location information of mobile device(s); properties or characteristics of the user device(s) (such as device state, charging data, date/time, or other information derived from a user device such as a mobile device); user-activity information (for example: app usage; online activity; searches; voice data such as automatic speech recognition; activity logs; communications data including calls, texts, instant messages, and emails; website posts; other user data associated with communication events; etc.) including, in some embodiments, user activity that occurs over more than one user device; user history; session logs; application data; contacts data; calendar and schedule data; notification data; social-network data; news (including popular or trending items on search engines or social networks); online gaming data; ecommerce activity (including data from online accounts such as Microsoft®, Amazon.com®, Google®, eBay®, PayPal®, video-streaming services, gaming services, or Xbox Live®); user-account(s) data (which may include data from user preferences or settings associated with a personal assistant application or service); home-sensor data; appliance data; global positioning system (GPS) data; vehicle signal data; traffic data; weather data (including forecasts); wearable device data; other user device data (which may include device settings, profiles, network-related information (e.g., network name or ID, domain information, workgroup information, connection data, Wi-Fi network data, or configuration data, data regarding the model number, firmware, or equipment, device pairings, such as where a user has a mobile phone paired with a Bluetooth headset, for example, or other network-related information)); gyroscope data, accelerometer data; payment or credit card usage data (which may include information from a user's PayPal® account); purchase history data (such as information from a user's Xbox Live®, Amazon.com®, or eBay® account); other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor components); data derived based on other data (for example, location data that can be derived from Wi-Fi, Cellular network, or IP address data); and nearly any other source of data that may be sensed or determined as described herein.

In some respects, user data may be provided in user-data streams or signals. A "user signal" can be a feed or stream of user data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some embodiments, user-data collection component 210 receives or accesses data continuously, periodically, or as needed.

User activity monitor 280 is generally responsible for observing user data for information that may be used for determining user activity information, which may include identifying and/or tracking features (sometimes referred to herein as "variables") or other information regarding specific user actions and related contextual information, such as user-composed communications. Observing user data, in some embodiments, comprises monitoring user data for information. Embodiments of user activity monitor 280 may determine, from the observed user data, user activity associated with a particular user. As described previously, the user activity information determined by user activity monitor 280 may include user activity information from multiple user devices associated with the user and/or from cloud-based services associated with the user (such as email, calendars, instant messaging, file storage, social-media, or similar information sources), and which may include contextual information associated with the identified user activity. User activity monitor 280 may determine current or near-real-time user activity information and, in some embodiments, may also determine historical user activity information, which may be determined based on gathering observations of user activity over time by accessing user logs of past activity (such as browsing history, for example). Further, in some embodiments, user activity monitor 280 may determine user activity (which may include historical activity) from other similar users (i.e., crowdsourcing), as described previously.

In some embodiments, information determined by user activity monitor 280 may be provided to task-query generator 260 and conversational assistant stack 270, including information regarding messages the user is composing, the current context and historical context (historical observations) for user-composed communications, and other user activity. As such, user activity monitor 280 may observe a user creating electronic communication content, such as an email, from data collected from a communication application (such as communication application 290 discussed below) by user-data collection component 210. Further, as described previously, user activity features may be determined by observing user data received from user-data collection component 210. In some embodiments, the user data and/or information about the user activity determined from the user data is stored in a user profile, such as user profile 240.

In an embodiment, user activity monitor 280 comprises one or more applications or services that analyze information detected via one or more user devices used by the user and/or cloud-based services associated with the user, to determine activity information and related contextual information. Information about user devices associated with a user may be determined from the user data made available via user-data collection component 210, and may be provided to user activity monitor 280, task-query generator 260, conversational assistant stack 270, or other components of system 200.

More specifically, in some implementations of user activity monitor 280, a user device may be identified by detecting and analyzing characteristics of the user device, such as device hardware, software such as operating system (OS), network-related characteristics, user accounts accessed via the device, and similar characteristics. For example, information about a user device may be determined using the functionality of many operating systems to provide information about the hardware, OS version, network connection information, installed application, or the like.

Some embodiments of user activity monitor 280, or its subcomponents, may determine a device name or identification (device ID) for each device associated with a user. This information about the identified user devices associated with a user may be stored in a user profile associated with the user, such as in user accounts and devices 246 of user profile 240. In an embodiment, the user devices may be polled, interrogated, or otherwise analyzed to determine information about the devices. This information may be used for determining a label or identification of the device (e.g., a device ID) so that user interaction with the device may be recognized from user data by user activity monitor 280. In some embodiments, users may declare or register a device, such as by logging into an account via the device, installing an application on the device, connecting to an online service that interrogates the device, or otherwise providing information about the device to an application or service. In some embodiments, devices that sign into an account associated with the user, such as a Microsoft® account or Net Passport, email account, social network, or the like, are identified and determined to be associated with the user.

As shown in example system 200, user activity monitor 280 comprises a user-interaction capturer 282, a contextual information extractor 284, and a features determiner 286. In some embodiments, user activity monitor 280, one or more of its subcomponents, or other components of system 200 may determine interpretive data from received user data. Interpretive data corresponds to data utilized by these components of system 200 or subcomponents of user activity monitor 280 to interpret user data. For example, interpretive data can be used to provide other context to user data, which can support determinations or inferences made by the components or subcomponents. Moreover, it is contemplated that embodiments of user activity monitor 280, its subcomponents, and other components of system 200 may use user data and/or user data in combination with interpretive data for carrying out the objectives of the subcomponents described herein. Additionally, although several examples of how user activity monitor 280 and its subcomponents may identify user activity information are described herein, many variations of user activity identification and user activity observation are possible in various embodiments of the disclosure.

User-interaction capturer 282 is generally responsible for capturing user activity, including detecting when a user action or event has occurred. For instance, embodiments of user-interaction capturer 282 may determine or receive content as a communication is composed by the user, such as textual data captured as a user types a message. Embodiments of user-interaction capturer 282 also may be used for determining current user activity or one or more historical user actions. Some embodiments of user-interaction capturer 282 may observe user data for activity-related features or variables corresponding to user activity, such as indications of applications launched or accessed, files accessed, modified, copied, etc., websites navigated to, online content downloaded and rendered or played, or similar user activities.

Additionally, some embodiments of user-interaction capturer 282 extract from the user data information about user activity, which may include current user activity, historical user activity, and/or related information such as contextual information. (Alternatively or in addition, in some embodiments, contextual information extractor 284 determines and extracts contextual information. Similarly, in some embodiments, features determiner 286 extracts information about user activity, such as user-activity related features, based on an identification of the activity determined by user-interaction capturer 282.) Examples of extracted user activity information may include app usage, online activity, searches, calls, usage duration, application data (e.g., emails, messages, posts, user status, notifications, etc.), or nearly any other data related to user interactions with the user device or user activity via a user device. As such, user activity captured by user-interaction capturer 282 may include user-composed electronic communications, such as emails, instant messages, calendar or meeting events, voice data, and the like. User-interaction capturer 282 may extract the content (such as textual content or audio content from user speech) within the user-composed electronic communications. In some embodiments, extraction of electronic communication content may occur in real time or near real time.

Among other components of system 200, the extracted user activity information determined by user-interaction capturer 282 may be provided to other subcomponents of user activity monitor 280, task-query generator 260, or conversational assistant stack 270. For example, the user activity information may be used by task-query generator 260 to determine tasks the user intends to complete when creating an electronic communication, as described below. Further, the extracted user activity may be stored in a user profile associated with the user, such as in user-knowledge database 242 of user profile 240. (In some embodiments, user-interaction capturer 282 or user activity monitor 280 (or its other sub components) performs conflation on the detected user activity information. For example, overlapping information may be merged and duplicated or redundant information eliminated.)

In some embodiments, user-interaction capturer 282 runs on or in association with each user device for a user. User-interaction capturer 282 may include functionality that polls or analyzes aspects of the operating system to determine user activity related features (such as installed or running applications or file accesses and modifications, for example), network communications, and/or other user actions detectable via the user device including sequences of actions.

Contextual information extractor 284, in general, is responsible for determining contextual information related to the user activity (detected by user-interaction capturer 282 or user activity monitor 280), such as context features or variables associated with user activity, related information, and user-related activity, and further responsible for associating the determined contextual information with the detected user activity. For example, contextual information extractor 284 may, in some embodiments, determine context of a user content creation session (e.g., an email drafting session) and determine contextual data about the user content creation session, which may be provided to one or more components of user activity monitor 280, task-query generator 260, and/or conversational assistant stack 270, along with content (e.g., type or dictating) input by the user.

In some embodiments, contextual information extractor 284 may associate the determined contextual information with the related user activity and may also log the contextual information with the associated user activity. Alternatively, the association or logging may be carried out by another service. For example, some embodiments of contextual information extractor 284 provide the determined contextual information to features determiner 286, which determines features of the user activity and/or related contextual information.

Some embodiments of contextual information extractor 284 determine contextual information related to user activity such as entities identified in a user activity or related to the activity (e.g., the recipient of an email, a proposed location for a scheduled meeting) or a location or venue of the user device when user activity is detected. By way of example and not limitation, this may include context features such as location data, which may be represented as a location stamp associated with the activity; contextual information about the location, such as venue information (e.g., this is the user's office location, home location, school, restaurant, movie theater), yellow pages identifier (YPID) information, time, day, and/or date, which may be represented as a time stamp associated with the activity; user device characteristics or user device identification information regarding the device on which the user carried out the activity; duration of the user activity, other user activity/activities preceding and/or following the user activity (which may include sequences of user activities); other information about the activity such as entities associated with the activity (e.g., people, objects, topics, venues); information detected by sensor(s) on user devices associated with the user that is concurrent or substantially concurrent to the user activity (e.g., motion information or physiological information detected on a fitness tracking user device, listening to music, which may be detected via a microphone sensor if the source of the music is not a user device), or any other information related to the user activity that is detectable that may be used for determining a task-intent of a user during creation of electronic communications as described below. For example, contextual information extractor 284 may determine information directly related to the substantive content within a user-composed communication, such as entities (as described below), action items, requests, and/or files. Contextual information extractor 284 may also, for instance, determine information relating to the platform of a user-composed communication (e.g., Microsoft® Outlook®, Microsoft® Teams).

In embodiments using contextual information related to user devices, a user device may be identified by detecting and analyzing characteristics of the user device, such as device hardware, software such as operating system (OS), network-related characteristics, user accounts accessed via the device, and similar characteristics. For example, as described previously, information about a user device may be determined using functionality of many operating systems to provide information about the hardware, OS version, network connection information, installed application, or the like. In some embodiments, a device name or identification (device ID) may be determined for each device associated with a user as previously described with respect to user activity monitor 280.

In some implementations, contextual information extractor 284 may receive user data from user-data collection component 210, parse the data, in some instances, and identify and extract context features or variables (which may also be carried out by features determiner 286). Context features may be stored as a related set of contextual information associated with the user activity and may be stored in a user profile such as in user-knowledge database 242. In some embodiments, the user activity information determined by user activity monitor 280, such as features of user activity (which may include context features), are used for one or more parts of semantic intelligence analyzer(s) 266. For example, if the user activity indicates that the user is spending time working with particular file names, project names, client names, or other topics or entities, then those topics or entities may be included in an entity resolver model or other semantic intelligence analyzer 266, as described further herein. In some instances, analyzed features corresponding to these topics or entities (or corresponding to other user activity features) may be weighted according to the frequency, amount of time, and/or recency (i.e., the "freshness" of the activity, which may be used for a decaying weighting, with more recent activity receiving a higher weight than "stale" activity that occurred farther in the past) that these topics or entities (or the other user activity features) occur in the user activity. In some cases, contextual information may be used by conversational assistant stack 270, such as for tailoring content-enrichment actions for a platform used by the user. Contextual information also may be determined from the user data of one or more users, in some embodiments, which may be provided by user-data collection component 210 in lieu of or in addition to user activity information for the particular user.

As mentioned, features determiner 286 may determine features for user activity information determined by user-interaction capturer 282 and contextual information extracted from contextual information extractor 284. In an example embodiment, features determiner 286 determines features relating to user-composed electronic communications. User-composed electronic communications may include, for example and without limitation, email; instant messages; direct messages; chats; social media communications, which may include tweets, posts, snaps, picturegrams, and other shared-media communications; voicemail; video-mail; mixed-media messages; and similar electronic communication formats. As such, features determined by one embodiment of features determiner 286 may include, without limitation, information about communication recipients (including recipient categories for those the communication was or is to be sent directly to, those who were or are to be copied, or frequency or patterns of communications to a recipient); the state of a communication (sent, draft, saved, replied to, forwarded, for example); date/time a communication was created, saved, revised, and/or sent; information derived from the content of the communication, which may include the message subject line or body of a communication (e.g., topics, entities, such as places or people, events, projects, action items, requests, files, or other information); attachments to the communication, as well as information about the user, user-related activity, or other contextual information.

Continuing with system 200 of FIG. 2, task-query generator 260 is generally responsible for analyzing user activity information and, in some embodiments, user-knowledge database 242 to predict a task a user intends to complete when composing an electronic communication (also referred to herein as a user-composed communication) and formulating a suggested task-query for implementing the predicted intended task (also referred to herein as a task-intent). In some embodiments, task-query generator 260 may run on a client computing device, on a server, as a distributed application across multiple devices, or in the cloud.

An embodiment of task-query generator 260, at a high level, may be considered as three layers: an intent classification layer, a semantic intelligence layer, and a post-ranking layer. In one embodiment, one or more of these layers run in parallel to determine relevant intent-queries. As described further herein, the intent classification layer, as well as the semantic intelligence layer, may include loosely coupled models targeted to resolution of the specific problem domain for which the models are built. These models can then be run in parallel, and new or updated models can be introduced or removed based on the larger needs of task-query generator 260 or the needs of the client calling contextual suggestions.

These high-level layers of task-query generator 260 may be formed of lower-level components. For instance, in an embodiment shown in FIG. 2, task-query generator 260 may include task-intent detector 262, candidate task-query determiner 264, semantic intelligence analyzer(s) 266, task-query formulator 268, and task-query ranker 269.

Task-intent detector 262 is generally responsible for identifying a task-intent of a user composing an electronic communication. A task-intent, as used herein, refers to a task a user intends to perform when composing electronic communications, such as an email or instant message. In this way, a task associated with a task-intent may be a task for enriching content of the communication and may be intended to be completed by the user before the user sends the communication. Examples of task-intents include attaching a file or object, creating a calendar event such as a future meeting, inserting content such as an image or presentation, a local search operation, or other intents associated with tasks the user desires to carryout in connection with the message. As such, a particular task associated with a task-intent may involve performing one or more computing operations, such as performing a search (e.g., a local or web search), or may involve the creation of an object, such as creating a calendar event.

Task-intent(s) may be identified by task-intent detector 262 based on the content being authored by the user within the communication. The content may include text data being input by a user (e.g., typed) or may include voice data where a communication is being dictated by the user. As communication content (e.g., text or voice) is being input by a user, the content and, in some embodiments, contextual information, is passed to task-intent detector 262 for identification of one or more task-intents to which the communication may be mapped. In some embodiments, task-intent detector 262 may analyze received content and, in some embodiments, contextual information, periodically at predefined intervals. The intervals may be defined in terms of time or in amount of content received (e.g., number of characters, number of words, or number of sentences since extracted information was last processed). In other embodiments, task-intent detector 262 analyzes content for intent continuously or at irregular periods.

Task-intent detector 262 utilizes task-intent logic 230 in storage 225 to determine a task-intent. Task-intent logic 230 include rules, conditions, associations, machine learning models, or other criteria for inferring or predicting a task-intent based on user-composed communication information. For example, task-intent logic 230 may determine, from the body of an email being composed by a user stating "as referenced in the picture below," a probability that the user intends to insert a picture within the body of the email Task-intent logic 230 may take different forms depending on the mechanism(s) used to determine user intents. For instance, in one embodiment, a set of intent classifiers may be utilized, wherein each classifier is configured to classify the information about the user-composed communication according to one or more specific intents, and wherein each classifier corresponds to a different potential task-intent. In some embodiments, these classifiers may comprise machine learning models (which may also be referred to herein as task-intent models), which in some embodiments may comprise one or more neural networks. In one example implementation, the models (or more generally, the classifiers) are created and managed independently and are loosely coupled such that they can be run in parallel. By running the classifier models in parallel, instead of in sequence, computational efficiency is improved because the time of this stage may be limited to the speed of the slowest classifier that runs (or, in one embodiment, may be a hard-capped time to receive a response). Further, loosely coupling models to run in parallel allows for any number of specialized models to be included, such as first-party or tenant-provided models, as described herein, while restricting the generated task-intents to specific problem domains (e.g., email and document intents for Microsoft® Outlook®, people and meeting intents for Microsoft® Teams, or other domains).

In some embodiments, task-intent logic 230 may comprise fuzzy logic, neural network(s), finite state machine, support vector machine, logistic regression, clustering, or other machine-learning techniques, similar statistical classification processes, or combinations of these to identify likely task-intents. In one embodiment, a set of models are trained offline to generate character and word embeddings using large corpora of textual content, webpages, and articles. The embeddings act as representations for word and character tokens with contextual and semantic information. The content input by a user (e.g., text) may be transformed to representations using the embeddings, and the representations may be then fed to bidirectional long short-term memory (LSTM) layers of a neural network, such as a recurrent neural network (RNN).

In one embodiment, the models are trained using a dataset of short replies extracted from a smart reply feature in an email client application, such as communication application 290, and manually annotated using crowd sourcing where three unique judges are presented a sentence and asked if a user is discussing, requesting, or offering to send or receive a file such as a presentation, document, or multimedia file. In an embodiment, the training data is in a format of a two-column spreadsheet file (e.g., tab-separated-values file), where the first column contains a query and the second column contains an intent. The task-intent models, as well as the entity-recognition models discussed below with respect to entity-recognition logic 235, may be trained in accordance with various user-specified parameters, including learning rate, batch size, size of RNN layers, number of RNN layers, size of feed-forward layers, pre-trained embeddings, early stopping requirements, and use of conditional random field (CRF) layers (for entity-recognition models), for example.

The task-intent logic 230 may output a prediction of an intent being expressed within the user's composed content. In exemplary embodiments, a model associated with each task-intent provides a prediction for the associated task-intent. For instance, the output may comprise a binary classification or Boolean statement indicating whether or not the associated task-intent is present. In some embodiments, the predictions output also contains information utilized for generating metrics such as precision, recall, F-score, and accuracy. However, it is also contemplated that a conllevel.pl may be used to generate a full classification report.

Each task-intent model may determine a task-intent confidence score associated with each output. The task-intent confidence score may reflect a likelihood that the intent associated with the logic is properly identified from the user activity data. In some embodiments, only intents satisfying (e.g., meeting or exceeding) a predefined confidence score (e.g., 95% or higher) are considered to be present and used to ultimately formulate a task-query as described further herein.

In some embodiments, multiple intents may be determined concurrently or otherwise from the same user activity information. For example, where multiple task-intents are identified with a sufficiently high confidence based on the received user-created content, multiple task-intents may be used to suggest task-queries to the user. Interface 500 of FIGS. 5A-5C, for instance, illustrate an example instance in which task-queries for scheduling a meeting and attaching a file are both suggested.

Continuing with task-query generator 260, candidate task-query determiner 264 is generally responsible for identifying a set of candidate task-queries for task-intents identified by task-intent detector 262. In some embodiments, each task-intent is associated with one or more candidate task-queries that could be used to implement actions to achieve the task-intent.

Each candidate task-query may include fields or slots for one or more entities associated with the task-intent, and candidate task-queries associated with the same task-intent may differ in terms of the number and/or type of entities included As used herein, an entity may be a person, a place, an object, an event, a time (date and/or time), a topic, an idea, and the like. For instance, candidate task-queries for a "create a calendar event" task-intent may include "person," "location," "time," "date," "topic," and the like. As such, a set of candidate task-queries for that intent may include: "schedule meeting with [Person]," "schedule meeting on [Date] at [Time]," "schedule meeting with [Person] on [Date] at [Time]," "schedule meeting at [Location]," "schedule meeting with [Person] at [Location]," "schedule meeting about [Topic]," "schedule meeting about [Topic] on [Date]," and the like. An attach file task-intent, on the other hand, may correspond to candidate task-queries that includes entities for the keyword(s), file type, file name, contact name, and/or date/time.

In some aspects, the set of candidate task-queries are identified using rules or associations determined using previous user task-queries. For example, in one embodiment, a long-term storage mechanism is used for storing a set of every query that is known to work with a digital assistant service, such as conversational assistant services 272 discussed below, and the associated intent of the query. By identifying candidate task-queries using the determined task-intent, the full-set of queries can be reduced to a set that is known to fulfill the detected task-intent, which may be a more manageable amount for processing in deeper intelligence layers as described in some embodiments herein.

As illustrated in FIG. 2, such processing in deeper intelligence layers may include using one or more semantic intelligence analyzers 266 that are generally responsible for facilitating task-query generation and determining a semantic understanding. Determining a semantic understanding includes determining semantically similar task-queries or portions thereof, and/or extracting and (or otherwise resolving) entities from message-related content or other features, for the candidate task-queries identified by candidate task-query determiner 264. In some embodiments, this processing may be performed using not only the identified candidate task-queries but also contextual information determined by contextual information extractor 284 or other information determined by user activity monitor 280, in some embodiments, which may be stored in user-knowledge database 242.

Semantic intelligence analyzer 266 may include one or more specific analyzers (e.g., 267a-b) that enable the intelligence layer to make determinations such as what queries may help this user in enriching the communication content or to what document is this user referring. As such, in one embodiment, semantic intelligence analyzer 266 comprises a semantic interpreter 267a that is generally responsible for identifying semantic equivalents of features extracted from user-composed content (or otherwise determined from user-related activity). For example, when a user types, in an email body: "We created a presentation last week. Let's talk about it when we meet," the semantic interpreter may recognize "it" as referring to the presentation created last week. In some embodiments, semantic interpreter 267a may comprise one or more semantic similarity models (not shown in FIG. 2) that utilize historic task-queries to find similarities with the current user content in order to facilitate determining a user's intent and/or formulating a task-query. One example of a semantic interpreter is illustrated as semantic similarity models of semantic layer models 318 in FIG. 3A and further described in connection to FIG. 3A.

In some embodiments, semantic intelligence analyzer 266 comprises an entity resolver 267b that generally determines the entities associated with the user's communication. For example, where a user's intent is "schedule a meeting," an entity resolver 267b may identify feature values for a time, date, location, people, and a topic for the meeting to be scheduled. Some embodiments of entity resolver 267b perform slot tagging, as described previously, to determine a particular entity that is likely associated with a particular slot or field in a candidate task-query.

An entity resolver may utilize the content of the communication being composed and, in some embodiments, contextual information or other user-related activity information. For instance, where an email is being drafted, entity resolver 267b may identify a value for a "person" entity based on a greeting line within the body of an email (e.g., "Hi Robert") and/or from an email address within the recipient field of the email. In some embodiments, an entity resolver 267b considers historical user data, including user behavior patterns, to resolve an entity. For instance, some embodiments of entity may traverse a user-knowledge database, such as user-knowledge database 242, in order to determine a likely entity associated with a slot (or more generally with the user's intent). For example, entity resolver 267b may identify people with whom a user typically communicates, and in some instances, the time or context in which such communication typically occurs (e.g., during the work day, weekend, at home, while driving, or other contexts) and recognize uses of such people within the communication content or contextual information as a person. In this way, if a user often communicates with another user named "Robert Smith," entity resolver 267b may identify the text "Robert" within a user-composed communication as being a person.

Moreover, entity resolver 267b may add details to an entity identified in the user-composed communication content, which may be done using user behavior patterns/history in one embodiment. Using the above example, entity resolver 267b may not only recognize text "Robert" as referring to a person but may determine a likelihood that the person is "Robert Smith," and "Robert Smith" may be added to the entity slot instead of simply "Robert."

Resolving entities using historical patterns or historical user data may be performed by utilizing user-knowledge database 242. User-knowledge database 242 generally refers to one or more stored data structures with information about a particular user's observed activity and/or associations. In an example, the text of a chat message reads "Lincoln," which may refer to a person or a location. A user-knowledge database 242 associated with the author may indicate that the author often travels to Lincoln, Nebr., but may not include a contact person with the name "Lincoln." As such, it may be determined that "Lincoln" in the chat message more likely refers to a place. In this way, not only may the rest of the message content be utilized to provide context to make this determination, but a user-knowledge database 242 may be utilized.

In exemplary embodiments, user-knowledge database 242 comprises a user-knowledge graph of nodes and edges that represents a collection of interlinked descriptions of entities (represented by nodes), including real-world objects, events, situations, or abstract concepts, from various resources, including emails, events, users, files, groups, and social media accounts, for instance. Entity descriptions within the user-knowledge graph may contribute to one another, forming a network, where each entity represents part of the description of the entities related to it. Each node and edge (representing the relation between nodes, or the entities) can have properties. For instance, a node for the company Microsoft® may be connected with another node for a city Redmond, Wash., where each node may have a number of properties (in the form of name/value pairs, for instance), and the edge between the two nodes representing a "located in" relationship between Microsoft® and Redmond, Wash., may have properties such as time, type of location (e.g., headquarters), and a date of beginning of residency. In this way, user-knowledge database 242 in the form of a user knowledge graph may include factual information as well as semantic relationships.

Resolving entities may include traversing a user's knowledge graph to identify relevant entities for candidate task-queries using one or more already extracted entities as a parameter for traversal. For example, where a user inputs "Hi Robert, Let's discuss the presentation you created," the person entity "Robert" may be utilized to traverse the user's knowledge graph to identify potential entities (time, place, file, etc.) in the form of nodes interconnected with (associated with) a node for the entity "Robert."

Returning to entity resolver 267b, in some embodiments, entity resolver 267b utilizes entity-recognition logic 235 in storage 225 to identify entities for candidate task-queries. Entity-recognition logic 235 may include rules, associations, conditions, machine learning models, or inference algorithms utilized for determining entities for the candidate task-queries. In some embodiments, entity-recognition logic 235 comprises a one or more entity-recognition classification models, which each may be associated with a particular entity. For instance, a Timex model may be utilized to identify a time for a meeting, and a contact model may be utilized to identify one or more contacts/people to be invited to the meeting. In some embodiments, one model may be utilized to identify multiple entities. For instance, there may be one entity-recognition model that is associated with an "attach" task-intent and may identify a plurality of entities with slots in candidate attach task-queries.

In an embodiment, entity-recognition models may comprise deep neural networks, which may have a similar structure to the task-intent models, but are modified to enable returning sequences and include a CRF layer in a hybrid approach. In one example, the models may be trained from a training dataset that is manually annotated using judges trained to identify word tokens in the strings to one of 97 classes and is represented using the standard CONLL format for slot tagging (i.e., entity resolution). In other embodiments, entity-recognition logic 235 may comprise fuzzy logic, finite state machine, support vector machine, logistic regression, clustering, or machine-learning techniques, similar statistical classification processes, or combinations of these to determine or infer a likelihood of relevance of a particular entity to the user's intent.

In some instances, the entity-recognition logic 235 may be tuned or adjusted (such as by weighting model parameters) according to user preferences 248. For example, as described herein, in some instances a user may explicitly indicate, as user preferences, the user's preferred working hours within a calendar application, and identification of a time entity may be resolved in favor of the time being within the working hours when the task-intent is related to work (which may be determined for task-intents suggested for communication content created when the user is using a work-associated username or domain). Additionally, entity-recognition logic 235 may further provide an entity confidence score associated with an identified entity, with the entity confidence score reflecting a probability that the entity was properly identified. In some of these embodiments, a threshold may be utilized such that only determined entities having confidence scores satisfying the threshold (and thus having a higher probability of being properly identified) are utilized. Where the threshold is not satisfied, in some embodiments a candidate task-query may be determined (and formulated for providing to the user) that does not include the entity. For example, suppose the user intends to schedule a meeting with Robert. Where the entity resolver 267b utilizing entity-recognition logic 235 is unable to determine a particular entity (e.g., Robert) associated with the user's intent, then the user may be provided a task-query such as, "Schedule a meeting," which does not reference a particular entity (e.g., "Robert").

In a further embodiment, analyzer 267 comprises or utilizes a tenant-specific model. In some embodiments, tenant-specific models may be incorporated by or otherwise tailored to a particular domain or client and may be used to recognize domain or client specific entities. For example, a university may include a tenant-specific model to recognize its student names, campus buildings, and acronyms having a specific meaning within the domain (i.e., within the university).

In some embodiments, a combination of analyzers form semantic intelligence analyzer(s) 266. For instance, one example of semantic intelligence analyzers 266 may include a semantic interpreter 267a and an entity resolver 267b, and another example of semantic intelligence analyzers may include a semantic interpreter 267a, an entity resolver 267b, and one or more tenant models. In one embodiment, these the analyzers (e.g., 267a and 267b) run in parallel.

Once semantic intelligence is performed, task-query formulator 268 may form the task-queries. The task-queries may be created by annotating or tagging each candidate task-query with the resolved entities or other information determined by the semantic intelligence analyzers 266. In some embodiments, where an entity for a slot on a particular candidate task-query does not get resolved such that the entity is unknown or not known with a sufficient degree of certainty, no task-query is generated for the particular candidate query. In other embodiments, task-queries may still be formed by candidate task-queries without all of the slots tagged, and such task-queries may be presented to a user with prompts for more information in order to fill the slots.

Task-query ranker 269 is generally responsible for sorting and/or organizing the resulting task-queries formulated by the task-query formulator 268 to determine which task-queries are to be provided to a user. For example, in an embodiment, only the top two or three formulated task-queries are provided to the user, so as not to overwhelm the user or consume too much real-estate in the graphical user interface for message composition. Task-query ranker 269 also may reorder the results to move certain task-queries to the top of the list, introduce task-queries that were not originally detected as an immediate intent but are otherwise promoted, and remove task-queries that are deemed not suitable for the current context or communication application being used. In some embodiments, a ranking may be generated based on a task-intent confidence score as discussed above where higher-ranked task-queries have higher confidence scores. A ranking may also be generated based on an entity-recognition confidence score discussed above and/or a general semantic layer confidence score. In one example, confidence scores (e.g., task-intent confidence score and entity-recognition confidence score) are combined to identify an overall confidence score. Determining an overall confidence score may involve weighting scores from each analyzer (e.g., 267a-b) within semantic intelligence analyzers 266.

Other information may be used for determining an order or ranking of the task-queries. For example, in one embodiment, task-query ranker 269 may include a promotion model that promotes (i.e., moves up within a ranking) certain task-queries for task-intents that are being featured or would otherwise be beneficial to a provider of a client communication application, a provider of the conversational assistant, and/or a tenant. For instance, task-query ranker 269 may promote task-queries that will use other products or services from a service provider or tenant or promote task-queries that have shown as being beneficial to any scenario. In some instances, task-query ranker 269 may run a promotion model when, at any point during the task-query generator process, no task-queries are returned as useful, such as when as no user-composed content is being received or no task-intents are being detected. In these situations, the promotion model may provide "cold" suggestions of task-queries, which, in some embodiments, include a curated list of task-queries.

In some embodiments, task-query ranker 269 may create a ranking and dynamically update the ranking as more user-composed content and/or related contextual information is received. Further, feedback from selected suggestions and/or negative signals on results may be used to adjust a ranking.

Task-query suggestion interface 292 generally provides task-query suggestions or prompts to a user. Task-query suggestion interface 292 may comprise a graphical user interface (GUI) or other user interface(s), and may further include one or more applications or services on a client user device, across multiple client user devices, or in the cloud. For example, in one embodiment, task-query suggestion interface 292 includes functionality for managing the presentation of content to a user (or receiving of user input from a user) across one or more client devices associated with that user. Some embodiments of task-query suggestion interface 292 operate in conjunction with presentation component 220, further described below.

Figures 5A, 5B:
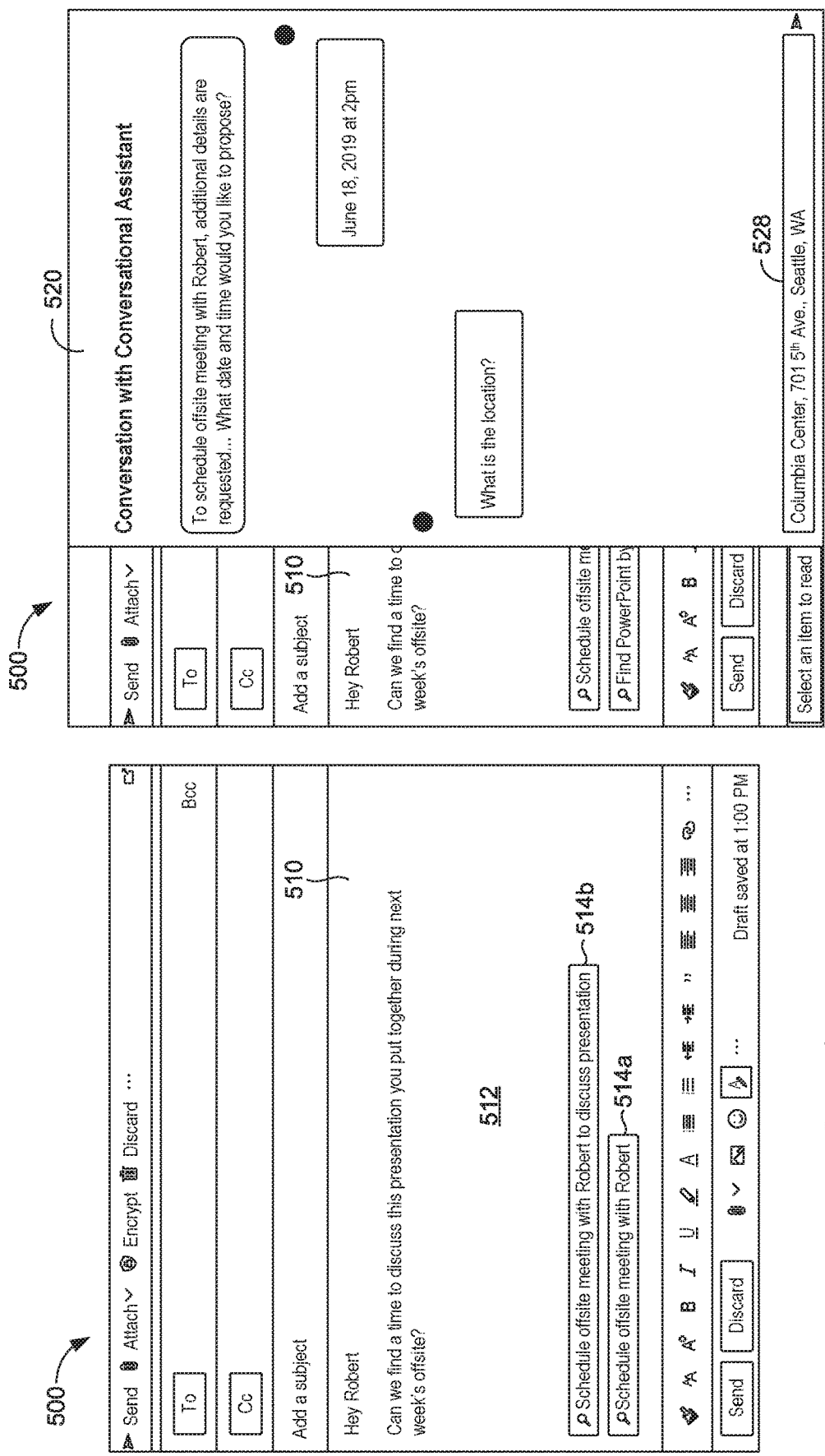
FIGS. 5A-D illustratively depict exemplary screenshots from a personal computing device showing aspects of an example graphical user interface, in accordance with an embodiment of the present disclosure.

In some embodiments, task-query suggestion interface 292 includes functionality for generating or presenting GUI features. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. In this way, task-query suggestion interface 292 may be utilized to suggest a task-query formulated from a predicted task-intent and/or to receive user selections of suggested task-queries. For instance, where task-intent detector 262 predicts an attach intent and task-query formulator creates related task-queries for attaching a file, task-query suggestion interface 292 may present graphic user interface components suggesting the task-queries to a user as selectable (e.g., clickable) options so that a user may identify which task-queries the user would like to perform. FIGS. 4A and 5A, discussed below, illustrate example embodiments utilizing task-query suggestion interface 292.

Further, task-query suggestion interface 292 may be integrated or cooperate with communication application 290 as described further below. As such, task-query suggestion interface 292 may format the task-queries formulated by task-query generator 260 for output for a particular platform such that task-queries are presented in a manner consistent with the platform being used for communication application 290, for instance. As an example, where a user is composing a message for a group chat in Microsoft® Teams, formulated task-queries may be formatted in a manner (e.g., font, size, text style, positioning for text output) that is consistent with the format of Microsoft® Teams. As such, task-query suggestion interface 292 may receive information identifying the platform and, in some embodiments, user preferences 248 associated with the identified platform.

One or more task-queries generated by task-query generator 260 may be presented to a user, via task-query suggestion interface 292, and selection of a task-query may initiate a dialog with a digital conversational assistant to confirm, modify, and/or execute the task-query. As such, system 200 further includes conversational assistant stack 270 that is generally responsible for executing the task-query and providing one or more related actions to facilitate completion of the task-intent. Conversational assistant stack 270 may further be used to provide a multi-turn dialog with the user regarding the suggested or selected task-queries. In this way, selection of a task-query may initiate an interface for interacting with the user and processing a task-query.

In some embodiments, a dialog with a digital conversational assistant may be initiated automatically without user selection of a task-query. Specifically, a predefined confidence score threshold may be used to determine whether to automatically initiate a digital conversational assistant without further selection by the user. The confidence score threshold for automatic initiation may be defined as an entity confidence score, such as the entity confidence score discussed with respect to entity resolver 267b or an overall confidence score, such as an overall confidence score discussed above with respect to task-query ranker 269. The confidence score of a generated task-query may be compared to the predefined confidence score threshold, and initiation of the digital conversational assistant may be automatically initiated if the generated task-query satisfies (e.g., meets or exceeds) the threshold score. In example embodiments, this confidence score threshold for automatic initiation of the digital conversational assistance is greater than a confidence score threshold for determining whether to generate a task-query or present a task-query to the user as discussed above entity resolver 267b and task-query ranker 269. In other words, a greater confidence in a generated task-query may be required for automatic initiation of the digital conversational assistant compared to presenting the generated task-query for selection by the user.

In some embodiments, conversational assistant stack 270 may run on a client computing device, on a server, as a distributed application across multiple devices, or in the cloud. As shown in FIG. 2, embodiments of conversational assistant stack 270 may include conversational assistant interface 271, conversational assistant services 272, task-skill(s) 274, task-response generator 276, and action determiner 278. Stack 270 is referred to herein as conversational assistant stack 270 because at least some of the components may be utilized in initiating and/or continuing a dialog between a digital assistant service and the user, but it will be appreciated that one or more components of stack 270 may be part of a digital assistant that is not directly part of a user dialog and that may be a service encompassing conversational assistant or separate from a conversational assistant.

Conversational assistant interface 271 is generally responsible for providing and receiving information necessary for confirming and/or modifying a task-query, such as a user-selected task-query. In some embodiments, conversational assistant interface 271 is automatically launched when a user selects a task-query via task-query suggestion interface 292. Conversational assistant interface 271 may comprise a GUI or other user interface(s) (which may be referred to herein as a conversational canvas) and may further include one or more applications or services on a client user device, across multiple client user devices, or in the cloud. For example, in one embodiment, conversational assistant interface 271 includes functionality for managing the presentation of content to a user (or receiving of user input from a user) across one or more client devices associated with that user.

In some embodiments, conversational assistant interface 271 includes functionality for generating or presenting GUI features. Such features can include interface elements, queries, and prompts similar to those identified for task-query suggestion interface 292. FIGS. 4B and 5B, discussed below, illustrate example embodiments of conversational assistant interface 271.

Further, similar to task-query suggestion interface 292, conversational assistant interface 271 may be integrated or cooperate with communication application 290 described further below. For instance, in one embodiment, conversational assistant interface 271 may format a dialog or the generated task-responses (responses to an executed task-query as described below) for output for a particular platform being used for communication application 290, for instance, such that the dialog and/or task-responses appear as part of the communication application 290. In another embodiment, conversational assistant interface 271 appears as a separate window/platform/application than the communication application 290 being used to compose the communication.

Conversational assistant services 272 are generally responsible for performing operations for interacting with the user. As such, conversational assistant services 272 generally are used during conversational runtime. In some embodiments, conversational assistant services 272 comprise digital-assistant computer services including services utilized for conversing with a user. In some embodiments, conversational assistant services 272 include logic used to understand input by the user for further processing. For example, conversational assistant services 272 may include a set of task-intent recognition models that are run against a "hero query." As used herein, a hero query is a task-query that is certain to result in consistent skill execution. This hero query may be converted into a semantic frame that contains information used in the execution of skills (such as task-skills 274) and that includes information such as task-intents, number of turns within the dialog between the user and the conversational assistant, and entities (e.g., people, dates and/or times, subjects, locations, or other entities).

Once a task-query is selected, the conversational assistant services 272 may be used to request additional information or clarification relating to the task-query from the user. For instance, a task-query for "attach a file from David" may be selected, and the conversational assistant services 272 may recognize that additional information may be needed (such as David's surname, a date range, or type of file) to effectively execute the task-query.

Conversational assistant services 272 may also identify the relevant set of skills or logic, referred to herein as task-skills 274, for carrying out the task associated with the task-intent. As used herein, a skill may comprise a set of instructions for enabling a digital assistant, including a conversational assistant, to carry out a particular task or operation. For example, a "schedule a meeting" task-intent may include logic for identifying what unknown information is needed, for checking a user's availability, for checking availability of meeting rooms if such capability is typically available, checking the weather for outdoor venue meeting options. An "insert image" task-intent will have a different set of task-skills 274.

Task-response generator 276 is generally responsible for generating the task-response identified when executing a task-query. For instance, a task-query to "attach a presentation from Robert" may result in one or more task-responses each representing a presentation from Robert.

In exemplary embodiments, for each task-response, task-response generator 276 may generate an adaptive card comprising a payload containing rendering information, follow-up action information, and raw data (such as user content 244). An adaptive card may be used to provide the task-responses in a format useable by the client application such that little to no further formatting action by the user is needed. In this way, the task-response will have a similar appearance if the user adds it to her message.

In some embodiments, a user may further interact with conversational assistant stack 270, via conversational assistant interface 271, to select or otherwise confirm a task-response, indicating a user's executive decision about what content is appropriate for enrichment of the electronic communication being composed.

Action determiner 278 is generally responsible for determining action(s) for implementing a task-response to enrich the communication content. Each task-response may be associated with a set of actions needed to be taken to complete the task-response. The actions required for completion of the task may be dependent on the platform used and, as such, action determiner 278 may detect the platform being used, such as the platform of communication application 290. For example, if a user selects a task-response for making a call, the output of action determiner 278 if a user is in Microsoft® Windows® may include actions to open a calling service in Windows® and make a call, but the output may, if a user is in Microsoft® Teams, be to place a call directly via Teams. In some embodiments, detection of the platform is performed by task-skill(s) 274. These actions determined by the action determiner 278 may be included within the task-response, such as the adaptive card, generated by the task-response generator 276.

The task-response, such as an adaptive card, may be provided to action handler 294. Action handler 294 is generally responsible for carrying out actions for enriching content of user-composed electronic communications in accordance with selected task-queries. For example, if the task-response contains an "attach" action, the action may have a corresponding identifier (e.g., "attach"). An action handler 294, which may be part of communication application 290 (e.g., email client application), observes for the "attach" action and subsequently runs the logic to use the data associated with the action (in this case, a URL to add a file as an attachment to the email). Likewise, if the task-response contains an "Add Image" action, the action may have an identifier of "add_Image." Communication application 290 may run an action handler 294 listening for "add_Image" and add an HTML image to the body of an email.

As indicated previously, one or more components of the system 200 may be incorporated into or cooperate with an application being used by the user to create communication content. FIG. 2, for instance, includes communication application 290, which is generally responsible for providing services facilitating electronic communications between client devices, such as user devices 102*a* through 102*n* in FIG. 1, via network 110. Example embodiments include applications for creating, receiving, and managing electronic communications, such as Microsoft® Outlook®, Microsoft® Office 360®, Microsoft® Teams, and Skype®. A user interface of communication application 290 may receive input composed by a user, such as e-mail text, and the communication content, as well as other contextual information related to the communication, may be provided to or otherwise made available by communication application 290 to other components of system 200, such as user activity monitor 280 or storage 225. Further, interface components of system 200, such as task-query suggestion interface 292 and/or conversational assistant interface 271, may be integrated with or cooperate with native interface components of communication application 290. For instance, in one embodiment, task-query suggestion interface 292 appears concurrently with interface components of communication application 290 and visually appears to be part of communication application 290. Further, in an example, conversational assistant interface 271 may appear concurrently with interface components of communication application 290 but may visually appear as a separate window as if from a separate application.

Example system 200 also includes a presentation component 220 that is generally responsible for presenting suggested task-queries, enriched communication content, and related information (such as a dialog with a conversational assistant) to a user. In one embodiment, task-query suggestion interface 292 and conversational assistant interface 271 may operate in conjunction with or may be implemented as one part of presentation component 220. Presentation component 220 may comprise one or more applications or services on a user device, across multiple user devices, or in the cloud. For example, in one embodiment, presentation component 220 manages the presentation of communications, such as emails and instant messages, to a user across multiple user devices associated with that user. Based on presentation logic, context (which may be received from user activity monitor 280), and/or other user data, presentation component 220 may determine on which user device(s) content is presented, as well as the context of the presentation, such as how (or in what format and how much content, which can be dependent on the user device or context) it is presented, when it is presented, or other such aspects of presentation.

In some embodiments, presentation component 220 generates user interface features associated with or used to facilitate presenting to the user aspects of task-query generator 260, conversational assistant stack 270, and any executed action (e.g., an email enriched through attachment of a file). Such features can include interface elements (such as icons or indicators, graphics buttons, sliders, menus, audio prompts, alerts, alarms, vibrations, pop-up windows, notification-bar or status-bar items, in-app notifications, or other similar features for interfacing with a user), queries, and prompts.

Example system 200 also includes storage 225. Storage 225 generally stores information including data, computer instructions (e.g., software program instructions, routines, or services), logic, profiles, and/or models used in embodiments described herein. In an embodiment, storage 225 comprises a data store (or computer data memory). Further, although depicted as a single data store component, storage 225 may be embodied as one or more data stores or may be in the cloud.

As shown in example system 200, storage 225 includes task-intent logic 230 and entity-recognition logic 235, as described previously, and one or more user profiles 240. One example embodiment of a user profile 240 is illustratively provided in FIG. 2. Example user profile 240 includes information associated with a particular user such as user-knowledge database 242, user content 244, information about user accounts and devices 246, and user preferences 248. The information stored in user profile 240 may be available to user-data collection component 210, user activity monitor 280, task-query generator 260, conversational assistant stack 270 or other components of example system 200.

As described previously, user-knowledge database 242 generally includes information about a particular user's observed activity and/or associations, which may include user actions or activity events, related contextual information, or other information determined via user activity monitor 280, and may include historical or current user activity information. In exemplary embodiments, user-knowledge database 242 comprises a user-knowledge graph as described above. User content 244 refers to content itself that is associated with the user. For example, user content 244 may include files (e.g., documents, presentations, emails, images, videos) that are created by, modified by, saved by, or accessed by the user; that are stored on a device associated with the user; and/or that are otherwise associated with a user account. User accounts and devices 246 generally include information about user devices accessed, used, or otherwise associated with a user, and/or information related to user accounts associated with the user, for example, online or cloud-based accounts (e.g., email, social media) such as a Microsoft® Net Passport, other accounts such as entertainment or gaming-related accounts (e.g., Xbox Live, Netflix, online game subscription accounts, etc.), user data relating to accounts such as user emails, texts, instant messages, calls, other communications, and other content; social network accounts and data, such as news feeds; online activity; and calendars, appointments, application data, other user accounts, or the like. Some embodiments of user accounts and devices 246 may store information across one or more databases, knowledge graphs, or data structures. As described previously, the information stored in user accounts and devices 246 may be determined from user-data collection component 210 or user activity monitor 280 (including one of its subcomponents).

User preferences 248 generally include user settings or preferences associated with one or more communication apps, such as communication application 290. By way of example and not limitation, such settings may include user preferences about specific venues or entities that the user considers to be relevant, and thresholds, user-composed communication preferences, and/or conversational assistant preferences, as described herein.

Figure 3A:
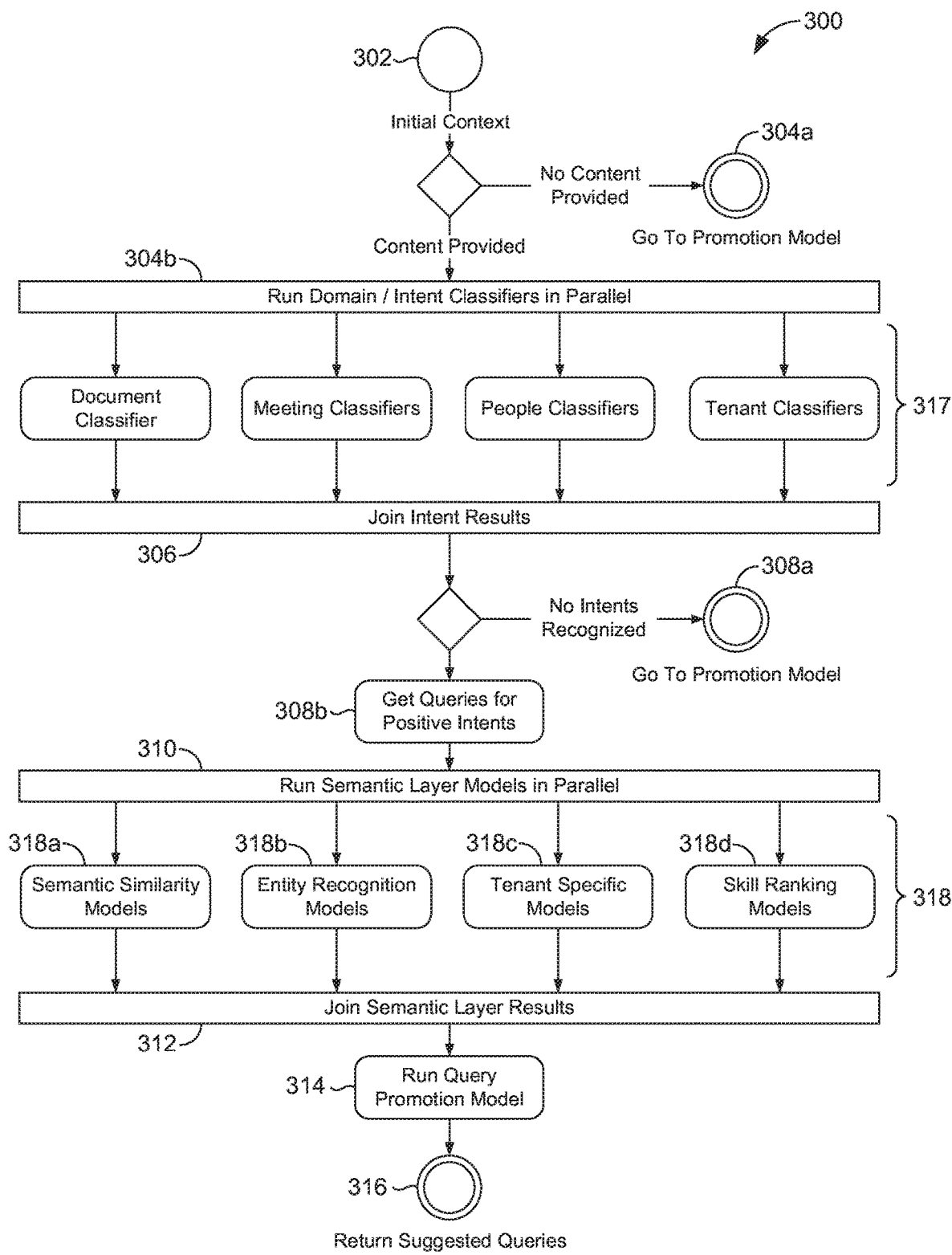
FIG. 3A illustratively depicts a diagrammatic representation of generating task-queries to suggest to a user in accordance with an embodiment of the present disclosure.
Figure 3B:
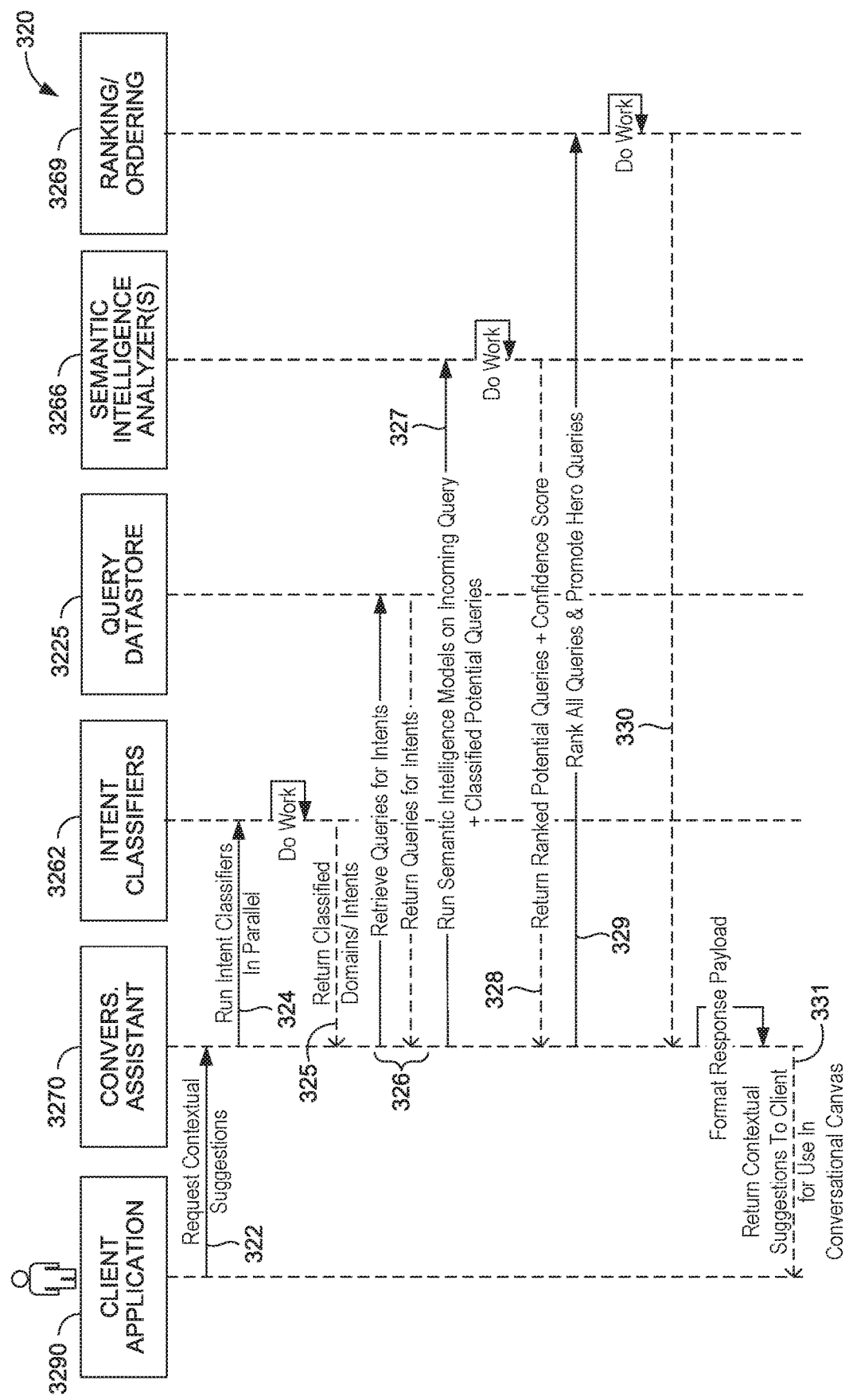
FIG. 3B illustratively depicts a diagrammatic representation of a communication flow between components of an example system in suggesting task-queries in accordance with an embodiment of the present disclosure.
Figure 3C:
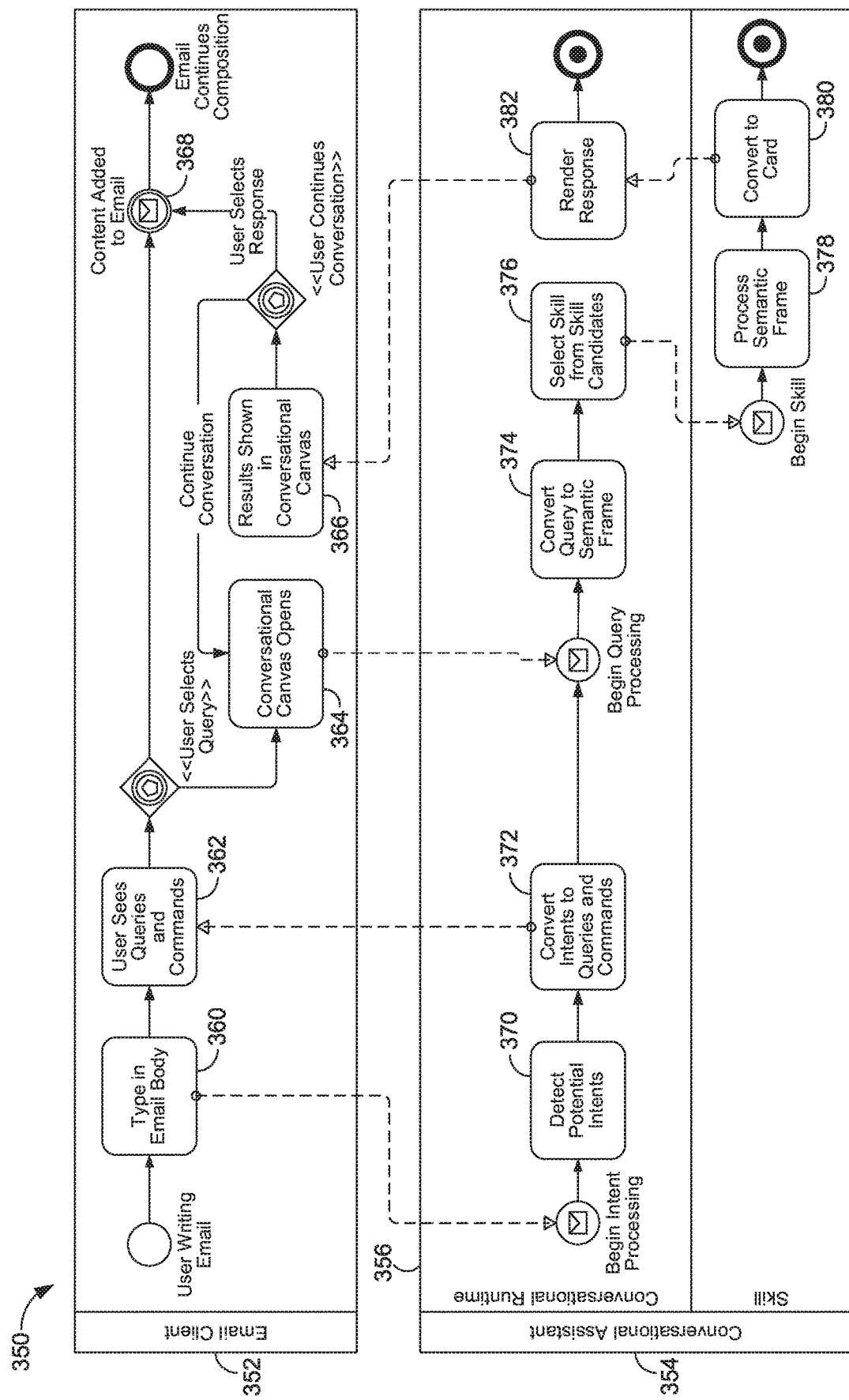
FIG. 3C illustratively depicts a diagrammatic representation of interactions between an email client application and a conversational assistant to enrich email content in accordance with an embodiment of the present disclosure.

FIGS. 3A-3C provide diagrammatic representations of embodiments of processes carried out by some embodiments of system 200 discussed above. FIG. 3A, for instance, depicts a process 300 for generating task-queries to suggest to a user. As such, one or more aspects of FIG. 3A may be performed by an embodiment of task-query generator 260 in FIG. 2 as discussed above. Initially, at step 302, a communication session may be initiated in a client application, such as communication application 290 described with respect to FIG. 2. The communication session may provide an initial context (e.g., an email is being drafted or a group chat is being opened) for task-query generation.

If no communication content is received via user input (e.g., text or audio input being observed as described with respect to user activity monitor 280), a promotion model may be utilized to suggest task-queries as shown in step 304a. The promotion model may provide one or more suggestions that are not content specific but, rather, are identified from a curated list of task-queries. The curated list may include most historically frequent task-queries selected either by a reference population or by the user specifically. In another embodiment, the curated list may include one or more task-queries being promoted to encourage use of related or sponsored services or products.

When content is received via user input, a set of intent classifiers 317 are run as shown in step 304b. This step may be performed by an embodiment of task-intent detector 262 described in FIG. 2, and the intent classifiers 317 in FIG. 3 may represent one embodiment of task-intent logic 230 described in FIG. 2. In one embodiment, each intent represented by the intent classifiers 317 in FIG. 3A are contained to a particular domain (e.g., a particular client application) and, therefore, may be referred to as a domain and intent classifier in FIG. 3A. By restricting intents to specific domains, results of the classifiers may be targeted specifically for the current domain being used (e.g., email and document intent classifiers may be used for Microsoft® Outlook®, and people and meeting intent classifiers may be used for Microsoft® Teams).

In some embodiments, the intent classifiers 317 may execute quickly and map the user-authored content into a set of proposed domains or task-intents. By executing the intent classifiers 317 quickly, some embodiments require less processing time and provide feedback to the user in the form of suggested task-queries The intent classifiers 317 may be considered as asking a set of basic questions about the context of content data being received. For instance, is the user intending to schedule a meeting with the message recipient and/or is the user intending to send an attached file to the recipient? In one embodiment, each classifier is created and managed independently, and the classifiers are loosely coupled together and run in parallel rather than in sequence as described above in one embodiment of task-intent detector 262 utilizing task-intent logic 230.

The results of the intent classifiers 317 may be joined in step 306. The results may include a set of intents found within the incoming content. At step 308a, where no intents are recognized, the promotion model may be used in a similar manner discussed in step 304a. Where one or more intents are recognized, a set of queries are received for those intents, as depicted in step 308b. Step 308b may be performed by an embodiment of candidate task-query determiner 264 described with respect to FIG. 2. In an embodiment, a set of queries known to work with a digital assistant is identified in a long-term storage mechanism and is associated with an intent and/or domain. As previously mentioned, by using these detected intents, the set of task-queries may be reduced to a set of task-queries that are known to fulfill the likely user intent, thereby improving computational efficiency by reducing processing waste in further intelligence step(s).

Once the set of candidate task-queries are identified based on what is believed to be relevant to the current content and, in some instance, context, semantic intelligence analysis may be performed utilizing semantic intelligence models 318 as shown at step 310. Step 310 may be performed by an embodiment of semantic intelligence analyzer(s) 266 described with respect to FIG. 2. In the embodiment illustrated, the semantic layer models 318 include semantic similarity model(s) 318a, entity recognition model(s) 318b, tenant-specific model(s) 318c, and skill ranking model(s) 318d. For instance, semantic similarity models 318a may identify semantic equivalents of features extracted from user-composed content or otherwise determined from user-related activity and, as such, may be an embodiment of semantic interpreter 267a in FIG. 2. Entity recognition models 318b, which may be an embodiment of entity resolver 267b described in FIG. 2, may determine entities associated with the user's communications and, in one embodiment, may perform slot tagging. Other models that may be included within semantic layer models 318 include one or more personalization models and disambiguation models (not shown).

These semantic layer models 318, filtered on the reduced query-set, may be used to target harder questions, such as "What queries can help a stuck user" or "What document is this user talking about," and map potential answers of those questions to the determined task-queries from the task-intent recognition step 304a. In the illustrated embodiment, these models are run in parallel.

At step 312, these results of the semantic layer models 318 may be joined, and task-queries may be created by an embodiment of task-query formulator 268. An initial sort may also be performed, such as a sorting based on confidence scores (e.g., task-intent confidence score and entity-recognition confidence score described above) returned from the execution of these models. This initial sorting may be performed by an embodiment of task-query formulator 268 or by an embodiment of task-query ranker 269 described with respect to FIG. 2.

In some embodiments, a second or final sort or organization of the results may be performed with a promotion model at step 314. This step may also be performed by an embodiment of task-query ranker 269 in FIG. 2 and may include moving specific results to the top of the list, introduce select task-queries that were not originally detected as an immediate intent, and remove results that are deemed not suitable for the current context or product. This may include promoting certain task-queries that utilized mutually beneficial products or services or that are sponsored by a service or product provider.

The final sorted set of suggested task-queries may be provided, at step 316, to a client application, such as communication application 290. In some embodiments, the client application determines if the task-queries being returned are strong enough to be provided to a user. Such a step would allow client applications, such as Microsoft® Outlook®, Teams, or Cortana® Windows Agent, to control what is provided to the user, as each product or service may have differing requirements on what to show and when.

In some embodiments, feedback from user-selected suggestions or signals associated with results (e.g., selection or non-selection of a result by a user), are fed back to one or more models within intent classifiers 317 and/or semantic layer models 318 to learn from the historical queries. Such feedback or signals may also be provided to promotion model and any integrated personalization models.

FIG. 3B depicts an example communication layer 320 depicting aspects of communication among multiple components of an example system for proactively enriching user content through observing user composition of content. One or more aspects of the communication layer 320 may be performed by embodiments of system 200 in FIG. 2.

In one embodiment, communication layer 320 involves multiple models that exist within a task-query generator, such as task-query generator 260, and that are useable by digital assistant services, such as conversational assistant services 272. In an embodiment, the digital assistant (which may be referred to herein as the conversational assistant) may act as a top-level orchestration layer, handling the determination of logic on what classifiers and/or models to run and providing a central interface (e.g., conversational assistant interface 271) for client applications to consume.

At 322, a client application 3290, such as communication application 290 described above, requests contextual suggestions (i.e., suggested task-queries) from a conversational assistant 3270. In one embodiment, the communication at 322 comprises sending an array of activity payloads, where the activities being sent act as a "history" for the conversation (e.g., an email chain or a chat) taking place, with "to" and "from" fields being populated. In some aspects, the most relevant/strongest signals for suggesting task-queries (and/or extracting entities) may come from the most recent activity "from" a user and the most recent activity "to" a user and are the recommended activities for a client application to send.

To correlate the user making a request with the user identified in the "to" and "from" fields on the activity, authentication information may need to be provided. This information may be provided by the client application 3290 and may include information about a user's accounts or devices, such as user accounts and devices information 246 in FIG. 2. In some embodiments, these requests to the conversational assistant 3270 are being made between two services in related client applications, such as applications that are part of Microsoft® 365, and, as such, STI tokens may be used to pass this authentication information.

The next operations within communication layer 320 are performed to ultimately determine which, if any, task-queries are contextually relevant and may be referred to herein as a substrate intelligence layer. At 324, one or more task-intents associated with the context of the data from the client application are identified using intent classifiers 3262. In some embodiments, this operation has a very short response time, or approximately 20-30 milliseconds, and is used to initially classify the incoming data into a format to be used for task-query selection. The classified intents may be returned to the conversational assistant at 325.

In one embodiment, there are many intent classification models built within a substrate intelligence layer and hosted on a machine learning service for query classification (which may be referred to herein as QAS), and 324 may happen in parallel for all connected intent classifiers. Running connected intent classifiers in parallel may involve constructing an intent orchestrator/federator in code that can asynchronously manage requests to individual classifiers. For instance, in an embodiment, the Reply with SCR classifier, hosted in QAS, is used to detect a content search intent. The PilotFish QAS endpoint may be pointed to for consuming these models, and the QAS HTTP Client may be utilized to abstract the communication process in-code. As such, the conversational assistant can act as an orchestrator to assist in the selection of these classifiers based on the channel being executed and the flights being enabled for the request, and can handle any "intent" conversion between the model and the conversational assistant's understanding of specific domains and intents.

Once the incoming content is classified into a one or more intents (which, as described above, may each be associated with a domain), the conversational assistant retrieves task-queries correlated to those intents (and/or the associated domains) out of a larger dataset of queries supported by the conversational assistant at 326. Operations at 326 may be performed by an embodiment of candidate task-query determiner 264 in FIG. 2. To retrieve task-queries correlated to the detected intents and/or domains, a datastore may be built (e.g., query datastore 3225) that contains "golden path" queries for the conversational assistant, indexed on the intents and/or domains associated with the specific query. Golden path queries, as used herein, refers to task-queries that have historically been used or selected most frequently by users. In some embodiments, golden path queries may additionally or alternatively include task-queries with high business impact. Conversational assistant 3270 may pass the classified intents as a filter to the data store to retrieve task-queries. For example, in one embodiment, CosmosDB and Microsoft.Azure.DocumentDB.Client SDK may be used such that LINQ may be used as an in-code filtering mechanism. Operations 326 may potentially return, from query datastore 3225, multiple queries associated with the same intent and/or domain but annotated with different entities such that the queries are distinct.

After the operations at 326, there may be a filtered set of task-queries (candidate task-queries) acting as a targeted dataset for use by semantic intelligence analyzers 3266, which may be an embodiment of semantic intelligence analyzers 266 discussed above with respect to FIG. 2. These semantic intelligence analyzers 3266 may include deeper, longer-form semantic models forming a second intelligence-based layer in this process for an understanding of the context of the observed content. Further, in some embodiments, these analyzers 3266 provide a ranking based on a semantic understanding, such as a determination of semantically similar task-queries or extracting entities that may exist and are not detected in the content.

As illustrated in FIG. 3B, the conversational assistant 3270 may orchestrate making the requests for performance of semantic intelligence at 327 and receiving a ranked set of potential task-queries and a confidence score at 328. In some embodiments, requests for semantic intelligence analyzers 3266 to be run may be made in parallel, based on the enabled flights (which include the available releases of a service), detected intents, and the particular client 3290 making the request. Additionally, in an embodiment, a predetermined number of results from each semantic intelligence analyzer 3266 is identified based on confidence scores (e.g., three most confident results from each analyzer) and combined together into an array containing task-queries, confidence scores, and the confidence model source to be ranked.

Using an array of queries, a ranking of task-queries, including promoted ("hero") task-queries, are requested at 329 and returned to the conversational assistant at 330. In one embodiment, the array of task-queries are provided with confidence scores to a ranker or orderer (e.g., ranking/ordering 3269), such as an embodiment of task-query ranker 269 of FIG. 2. In some embodiments, this ranker 3269 is an application of a set of rules. In other embodiments, ranking is done by a service or model that understands the source of a provided confidence score and determines which queries are most valuable to both a client application provider and the user based on feedback data, usage data, and/or a weighting from the business needs of the client application provider as discussed with respect to embodiments of promotion model in FIG. 3A.

At 331 in FIG. 3B, contextual suggestions in the form of ranked task-queries may be provided by conversational assistant 3270 and presented to a user via a conversational assistant interface (which may be referred to herein as a conversational canvas). In particular, the response provided at 331 may be returned to the client application 3290 as a single activity response containing the set of suggested task-queries as a set of suggested actions. The response payload sent to client application 3290 may be formatted based on the particular client application 3290. In this way, the response from the conversational assistant 3270 may be integrated into the interface of the client application 3290 with little to no further formatting needed to be provided to a user.

Turning to FIG. 3C, a diagram 350 is provided illustrating an example perspective showing allocation of functions between an email client 352 and a conversational assistant 354 in accordance with an embodiment of the disclosure. Email client 352 may be an embodiment of communication application 290 of FIG. 2 and, as such, may generally be responsible for providing services facilitating user creation of electronic communications such as emails. Conversational assistant 354, which comprises a conversational runtime component 356 and a skill component 358, may be used to detect task-intents, generate task-queries, and execute skills necessary to provide results of selected task-queries. In some embodiments, conversational assistant 354 may be supported by and or utilize functions described in connection with conversational assistant stack 270 of FIG. 2.

For example, a user may start writing an email via email client 352 by typing text into an email body at step 360. The content typed by the user into email client 352 is provided to conversational assistant 354 for task-intent processing. At step 370, conversational assistant runtime component 356 detects one or more potential intents (also referred to herein as task-intents). This step may be performed in accordance with the description of task-intent detector 262 of FIG. 2. Detected task-intents are converted to queries and commands (also referred to herein as task-queries) at step 372. Step 372 may include determining candidate task-queries (as discussed with respect to candidate task-query determiner 264), applying one or more analyzers (such as semantic interpreter and entity resolver as discussed with respect to semantic intelligence analyzers 266), combining the candidate task-queries and entities to formulate task-queries for the user (for example, as discussed with respect to task-query formulator 268), and ordering a final set of task-queries (for instance, as discussed with respect to task-query ranker 269).

At step 362, the queries and commands are returned to email client 352 for being provided to the user. Provision of suggested queries and commands may be done as described with respect to task-query suggestion interface 292 and presentation component 220 in FIG. 2. Upon a user selecting a suggested query, a process for adding content to the email may be initiated. In some embodiments, content is automatically added upon selection of a task-query such as, for example, when there is only one possible result for the selected task-query. In other instances, user selection of a task-query automatically initiates a conversational session (i.e., a dialog) with conversational assistant 354. The conversational session may include opening a user interface component, sometimes referred to herein as a conversational canvas, at step 364. A conversational canvas may comprise a user interface to facilitate user interaction with conversational assistant 354 through or in connection with email client 352, such as conversational assistant interface 271.

Initiating a conversational session at step 364 may also initiate processing of the selected task-query by the conversational assistant. As such, at step 374, the selected task-query may be converted to a semantic frame as discussed further with respect to an embodiment of conversational assistant services 272. Additionally, at step 376, a skill or set of skills corresponding to the intent of the selected query may be selected as described further with respect to embodiments of task-skill(s) 274 of FIG. 2.

At step 378, skill component 358 of conversational assistant 354 may initiate the skill by processing the semantic frame of the task-query at step 378 and converting the semantic frame to a useable payload, such as an adaptive card at step 380. These steps may be performed by an embodiment of task-skills 274 and task-response generator 276, respectively, of FIG. 2. The response may be rendered, at step 382, to provide to email client 352. Rendering the response may include determining actions for carrying out the task for the particular email client 352 as described with respect to embodiments of action determiner 278.

The formatted results are provided to the email client 352 and further provided to the user through the conversational canvas at step 366. A user may continue a conversation or dialog with conversational assistant 354 through the conversational canvas if the user needs to provide additional input or has requests for content. In these instances, any initial input from a user may continue or repeat the query processing steps by conversational assistant 354. When a user selects a response (also referred to herein as a task-result) via the conversational assistant, content is automatically added to the email in accordance with the selected response at step 368. A user may continue composing the email, and observing input of additional content may repeat the intent and query processing steps.

Turning now to FIGS. 4A-4C, various aspects are shown illustrating an example embodiment of a system for providing context-based content suggestions presented via graphical user interfaces. The graphical user interfaces may be displayed via a user device (not shown). In particular, with reference to FIG. 4A, a user interface 400 comprises a graphical user interface on a user device, such as a smartphone. Example user interface 400 depicts an example draft email 410 being provided to a user where the user can input information, such as recipient(s) (e.g., in "To" field 402, and "CC" field 404), a subject in subject line field 406, and a body in email body 408. In this example, a user has input the text: "Hey Robert, I am sending you the powerpoint presentation from Tuesday. Can you please review it?" In accordance with embodiments of the disclosure discussed with respect to FIGS. 2 and 3A-3C, the user-authored content may be utilized to detect potential task-intents and generate suggested task-queries. At least some of the task-queries may be provided to the user for selection, such as shown by suggested task-queries 414a and 414b. Generation of task-queries based on detected task-intents may be performed as described in connection with embodiments of task-query generator 260 in FIG. 2, and provision of task-intents to a user may be performed by an embodiment of a task-query suggestion interface 292 and/or presentation component 220.

Based at least on user input in email body 408 in FIG. 4A, queries relating to an intent for finding a file and an intent for scheduling a meeting are provided. The queries related to these intents are annotated with entities determined from the user's content and, in some aspects, additional context. For example, entities "Robert" 412a, "powerpoint" 412b, and "Tuesday" 412c may be identified from email body 408 as entities corresponding to types of entities associated with candidate task-queries (e.g., entities with corresponding slots in a candidate task-query). As such, suggested task-queries 414a states "Find PowerPoint by Robert from Tuesday" and suggested task-query 414b states "Schedule meeting with Robert."

Suggested task-queries 414a and 414b may be selectable interface components and selection of one of the suggested task-queries may initiate a conversational session through conversational canvas 420, as shown in FIG. 4B. As discussed with respect to FIG. 2, in some embodiments, the conversational canvas 420 may be presented without presentation of the suggest task-queries 414a and 414b in FIG. 4A where a confidence score for one task-query satisfies a confidence score threshold for automatic initiation of the conversational assistant.

As illustrated, conversational canvas 420 may appear concurrently as email 410 or other user interface components of client application (e.g., communication application 290 of FIG. 2). In this example, a user selected suggested task-query 414a ("Find PowerPoint by Robert from Tuesday"), and confirmation of the selected task-query 414a is provided by repeating the associated task in conversational assistant line 422 ("Here is what I found for Find PowerPoint by Robert from Tuesday") of conversational canvas 420. Conversational canvas 420 also includes an input area 428 that may be utilized by the user to input information for interacting with the conversational assistant, thereby creating a dialog. In some embodiments (not shown), a user may interact with the conversational assistant by speaking or other means, rather than typing text into input area 428.

Conversational canvas 420 further displays the results (also referred to herein as task-responses) from performance of skill(s) for the selected task-query. As such, user interface 400 of FIG. 4B includes task-responses 424a and 424b. Both task-responses match the selected task-query 414a (i.e., Find PowerPoint by Robert from Tuesday). Each task-response 424a and 424b may identify properties of the task-results. In this example, the result corresponds to a file and, as such, includes information for owner, file name, and file extension. Each task-response 424a and 424b may also include a content adding component, selection of which automatically initiates actions to add content corresponding to the task-result. For instance, task-responses 424a and 424b include an "Attach File" button 426 that may be selected by the user. Identification of these results from the selected task-query, identification of actions needed to carry out the task-response, and formatting the results may be performed by embodiments of conversational assistant stack 270 in FIG. 2.

FIG. 4C illustrates user interface 400 after a task-result is selected. Once selected, the task-response 424a for attaching the "CUSA-Weekly Shiproom" file is carried out, which includes attaching the file "CUSA-Weekly Shiproom" 430 to email 410. The process of carrying out the associated action may be performed by an embodiment of action handler 294 in FIG. 2. In this way, email 410 may be enriched with external content (i.e., the attached file) proactively through passively observing content without the user needing to manually perform steps for locating and attaching a relevant file.

Further, in FIG. 4C, after selection of a task-result, conversational canvas 420 disappears or may be minimized so that a user primarily sees the email 410 within user interface 400. Although conversational canvas 420 is not visible in this embodiment, the conversational assistant may still be running such that additional content input by the user within the email body, for instance, may be processed for detection of additional task-intents and, if appropriate, suggestion of additional task-queries.

Although FIGS. 4B and 4C depict embodiments in which a search-based task-query (e.g., find a file) is selected and executed, creation-based task-queries (e.g., creation of a calendar event) may also initiate query processing by the conversational canvas. For instance, a user could have selected task-query 414b from FIG. 4A to schedule a meeting with Robert. In that instance, the conversational assistant may automatically generate a new event user interface with one or more fields automatically populated with entity values known or predicted from the user-composed content in email 410 or determined from contextual data. Additionally or alternatively, the conversational assistant may identify what entities are missing from corresponding task-queries and begin a dialog, via conversational canvas 420, with the user to request such information before creating the calendar event for the meeting.

Selection of such a creation-based task-query is illustrated in FIGS. 5A-5D, which also depict a task-query that requires multiple actions. In FIG. 5A, user interface 500 comprises a graphical user interface on a user device, such as a smartphone. Similar to user interface 400 in FIG. 4, example user interface 500 depicts an example draft email 510 being presented to a user where the user could input information into different fields, including into email body 512. In this example, a user has input: "Hey Robert, Can we find a time to discuss this presentation you put together during next week's offsite?" In accordance with embodiments of the disclosure discussed with respect to FIGS. 2 and 3A-3C, the user-input content in email body 512 (and contextual information in some embodiments) may be used to detect task-intents and create related task-queries. As illustrated, a first task-query 514a (Schedule offsite meeting) and a second task-query 514b (Schedule offsite meeting with Robert to discuss presentation) are provided in user interface 500. Second task-query 514b is a creation-based task-query but also identifies a presentation that may be searched for. Generation of the task-queries 514a and 514b may be done by embodiments of task-query generator 260 in FIG. 2, and presentation of task-intents to a user may be done by embodiments of task-query suggestion interface 292 and/or presentation component 220.

After a user selects second task-query 514b, the conversational canvas 520 may be shown with email 510, as shown in FIG. 5B. In this example embodiment, the conversational assistant requests additional information from the user to populate within fields for a calendar event. Specifically, the conversational canvas 520 shows the conversational assistant asking for a proposed time and date for the meeting and a location. The user may input the appropriate information into user input box 528 as shown. In some embodiments, the conversational assistant may identify entities for these fields from the user-input content in the communication being composed or from other data sources, including user-knowledge database 242 of FIG. 2. For instance, where a date or time is not found in the user-composed content, the conversational assistant may identify possible times based on the user's availability and, in some embodiments, the availability of likely invitees. Alternatively, one or more of the calendar event fields may be left blank during creation of a calendar event and populated later with user input. Additionally, as discussed with respect to FIG. 2, in some embodiments, the conversational assistant may initiate the dialog through conversational canvas 520 automatically after a task-query is formulated without presentation of the suggest task-queries 514a and 514b to the user in FIG. 5A where a confidence score for one task-query satisfies a confidence score threshold for automatic initiation of the conversational assistant.

Figure 5C:
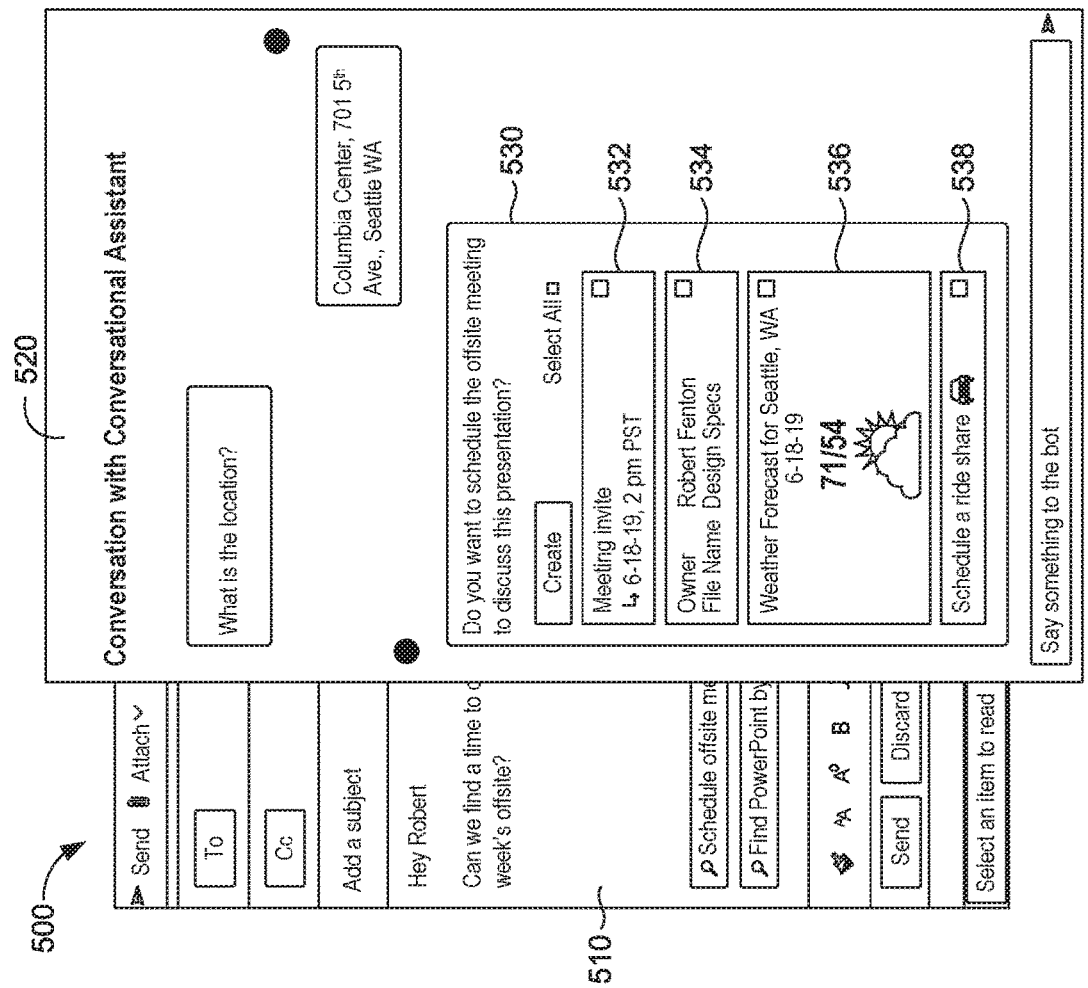

After receiving requested information, the conversational assistant may continue processing the selected task-query to provide a response in FIG. 5C. User interface 500 in FIG. 5C includes conversational canvas 520 providing results 530 for creating a meeting invitation. The results 530 include content related to the calendar invitation, including a meeting invite 532 for generating a meeting invitation with the information extracted from user content and/or received through conversational canvas 520. Results 530 further include a file option 534. Because the selected task-query 514b included a file (i.e., "the presentation") as an entity (i.e., a subject/topic for the meeting), some embodiments include searching for the file and presentation of the file as a content option.

Additional external content related to the meeting invitation may be included as results 530 with the meeting invite 532. In some embodiments, this content may be identified in accordance with user preferences and/or semantic knowledge. For example, the conversational assistant may recognize that "offsite" is typically used by the user to refer to a location that is outside of the office. As such, the conversational assistant may suggest, as additional content to include in the meeting invitation, weather forecast option 536 and transportation option 538.

One or more of these content options may be selected for being provided with the meeting invite 532 within email 510. Providing these results may include creating a universally accepted payload format or adaptive card to maintain consistency between the client application (e.g., communication application 290) and the conversational canvas (e.g., conversational assistant interface 271) as discussed above with respect to embodiments of task-response generator 276 in FIG. 2. One or more of these results may be selected by the user.

Figure 5D:
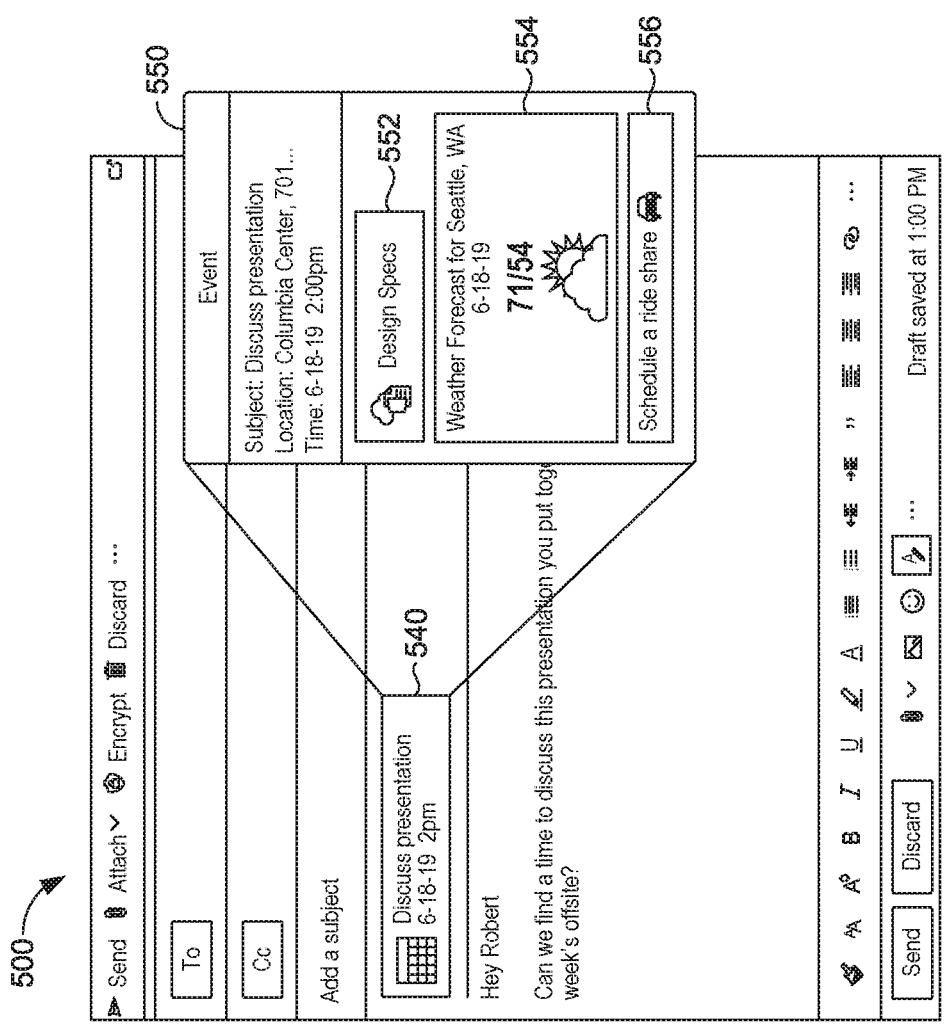

Turning to FIG. 5D, the user interface 500 includes the generated supplemental content to enrich the user-composed content of email 510 after user selection of one or more task-results. Email 510 includes a meeting invitation attachment 540 based on selection of all options within results 530 in FIG. 5C. Attaching the meeting invitation to the user-created email 510 may be done by an embodiment of action handler 294 of FIG. 2.

Selection of meeting invitation attachment 540 may bring up details of the meeting invitation, including the information requested from the user (date/time and location in this example) as shown in invitation 550. Additionally, the file suggested in FIG. 5C is included as an attachment 552 to invitation 550. Other selected content options, such as weather forecast 554 corresponding to the date and location of the meeting and scheduling transportation 556, may be presented as part of the invitation 550.

Accordingly, as shown in FIGS. 5A-5D, embodiments of the present disclosure may handle the detection and execution of more complex task-intents. In this way, embodiments may better tailor additional content suggestions to enable different types of content to be identified and created within the same intent and query processing stages, thereby improving computational efficiency.

Figure 6:
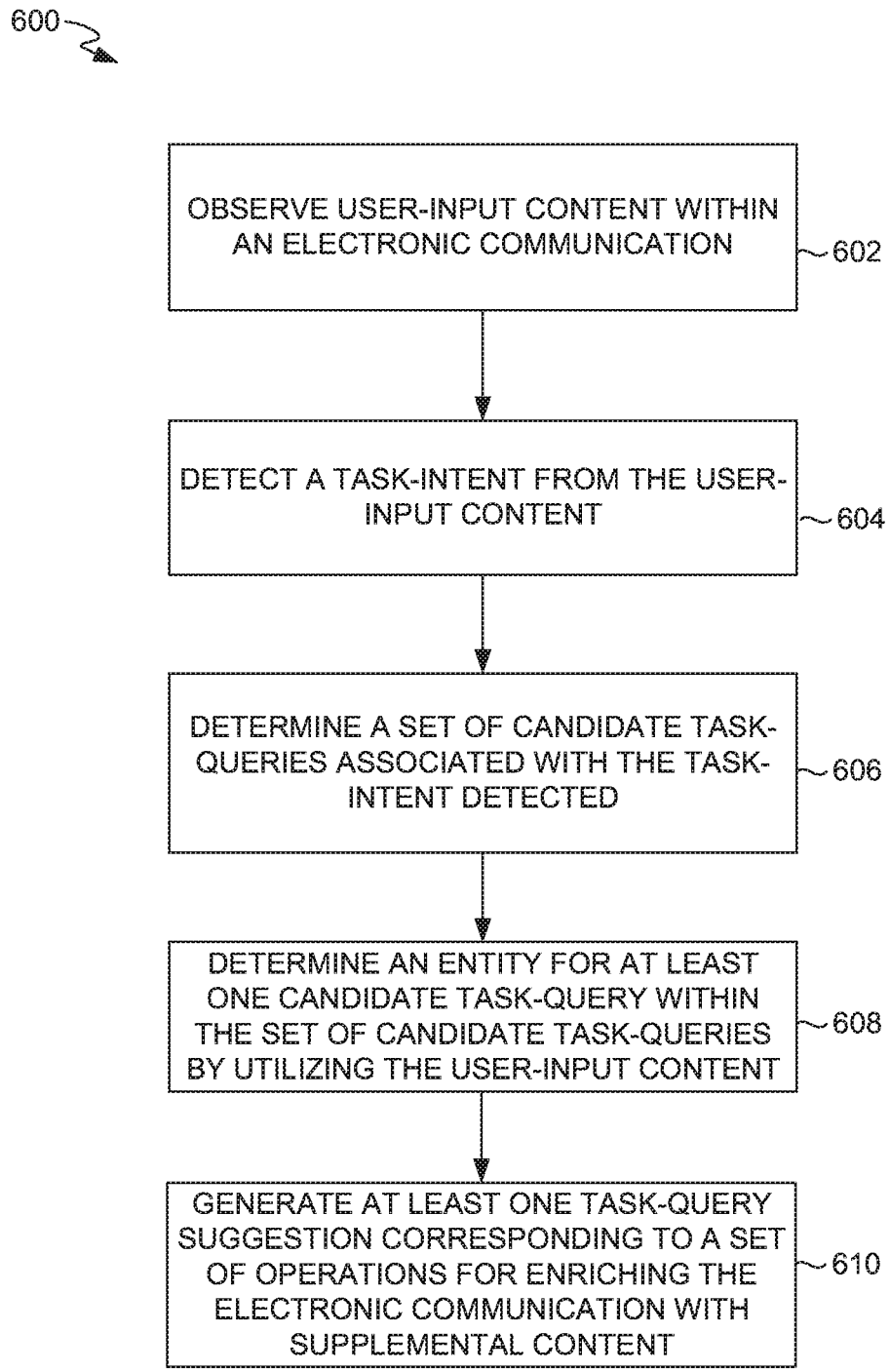
FIGS. 6-7 depict flow diagrams of methods for enriching user-composed electronic communications in accordance with embodiments of the present disclosure.

Turning to FIG. 6, a method 600 for generating and suggesting task-queries for implementing a user's likely intent in composing an electronic communication is shown. Each block or step of method 600 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few. Accordingly, method 600 (and method 700 of FIG. 7) may be performed by one or more computing devices, such as a smartphone or other user device, a server, or by a distributed computing platform, such as in the cloud.

Accordingly, as shown at block 602, the method 600 includes observing a user-input content within an electronic communication. User-input content may include textual data from text composed within body of an electronic communication (e.g., body of an email, text message, or chat message) or audio data from a user's speech input. Embodiments of block 602 may be performed by user activity monitor 280 in FIG. 2.

At block 604, a task-intent is detected from the user-input content. As used herein, the task-intent may be associated with a task for enriching the electronic communication with supplemental content. In some embodiments, enrichment of the electronic communication comprises adding supplemental content, such as objects, images, videos, files, calendar events, hyperlinks and the like. As such, a task-intent detected may include attaching a file or object; creating a calendar event, such as a future meeting; inserting content, such as an image or presentation; performing a local search operation; or other intents associated with tasks the user desires to carryout in connection with the message.

In some embodiments, task-intents are detected using one or more intent classifiers configured to classify information about the user-input content into a particular potential task-intent (if present). For instance, the task-intent may be detected by a first classifier, such as a first machine-learning model, configured to detect that task-intent specifically. A set of intent classifiers may be utilized with each model being configured to detect a different task-intent. In some embodiments, these classifiers are machine learning models that run in parallel. A plurality of task-intents may be identified from the same user-input content. In some embodiments, predictions of the machine-learning models are compared to threshold task-intent confidence scores, and only task-intents satisfying (e.g., meeting or exceeding) the threshold score are considered to be detected.

In addition to user-input content, the electronic message, such as an email or chat, may include additional contextual information (such as date/time, recipient(s), sender(s)) that is also observed and utilized to detect a task-intent. Additionally, other information related to the user, such as information in a user-knowledge database 242, may be utilized in detecting a task-intent. Detection of one or more task-intents from the user-input content may be performed in accordance with embodiments of task-intent detector 262 of FIG. 2.

At block 606, a set of candidate task-queries are determined based on the detected task-intent. In exemplary embodiments, the candidate task-queries that are determined at block 606 are candidate task-queries associated with the detected task-intent(s) based on historical task-queries previously determined to be associated with the task-intent. At least a subset of the candidate task-queries within the set may each have a field for an entity type (e.g., person, location, date, time, subject, and the like) that is associated that the task-intent corresponding to the candidate task-query. In some embodiments, for example, candidate task-queries may include fields or slots for certain types of entities associated with the task-intent, and candidate task-queries associated with the same task-intent may differ in terms of the number and/or type of entities included. For instance, candidate task-queries for a "create a calendar event" task-intent may include "person", "location", "time", "date," "topic", and the like. As such, a set of candidate task-queries for that intent may include: "schedule meeting with [Person]", "schedule meeting on [Date] at [Time]", "schedule meeting with [Person] on [Date] at [Time.]", "schedule meeting at [Location]", "schedule meeting with [Person] at [Location]", "schedule meeting about [Topic]", "schedule meeting about [Topic] on [Date]", and the like. An attach file task-intent, on the other hand, may correspond to candidate task-queries that includes fields for entities of different types, such as the keyword(s), file type, file name, contact name, and/or date/time. As illustrated, there may be some common entity types associated with different task-queries. Candidate task-queries may be identified in accordance with embodiments of candidate task-query determiner 264 in FIG. 2.

As at least some of the candidate task-queries may include fields for entities, method 600 further includes determining an entity for at least one candidate task-queries by utilizing the user-input content at block 608. The entity determined at block 608 may be an entity of the entity type associated with task-query. Entities may be extracted from the user-input content, contextual information, and/or other information from a user-knowledge database specific to the user inputting the content. Extracting entities may include applying one or more semantic intelligence analyzers, such as semantic intelligence analyzers 266 of FIG. 2. As such, a semantic interpreter (such as semantic interpreter 267a in FIG. 2) may identify semantic equivalents of features (entities) extracted from user-composed content.

Further, in some embodiments, an entity resolver (such as entity resolver 267b in FIG. 2) may identify which entities belong in the entity fields within the candidate task-queries. In one embodiment, this process involves performing slot tagging to determine a particular entity that is likely associated with a particular slot or field in a candidate task-query. In some embodiments, one or more entity-recognition classifiers, which may be machine learning models, are used to identify each entity.

In exemplary embodiments, the user-knowledge database is in the form of a knowledge graph of nodes and edges representing a collection of interlinked descriptions of entities (represented by nodes) is used to extract entities. Entities represented within the graph may include real-world objects, events, situations or abstract concepts, from various resources, including emails, events, users, files, groups, and social media accounts for example. In some embodiments, extracting entities for a candidate task-query includes traversing a knowledge graph according to a parameter (e.g., another entity) identified from the user-input content. Embodiments of user-knowledge database are described further with respect to user-knowledge database 242 in FIG. 2.

At block 610, at least one task-query is generated for suggesting to a user where the task-query corresponds to a set of operations for enriching the electronic communication with supplemental content. Each task-query may be generated by combining one of the candidate task-queries with the entities identified for that candidate task-query. In some embodiments, where an entity for a slot on a particular candidate task-query does not get resolved such that the entity is unknown or not known with a sufficient degree of certainty, no task-query is generated for the particular candidate query. In other embodiments, task-queries may still be formed by candidate task-queries without all of the slots tagged, and such task-queries may be presented to a user with prompts for more information fill the slots. Generating task-queries may be performed in accordance with embodiments of task-query formulator 268 of FIG. 2.

Method 600 may further include providing the one or more generated task-queries to a user via a user interface of a computing device. In some embodiments, the task-queries may be provided via visual output (e.g., text, icons, or images) of the suggested task-query. Additionally or alternatively, the suggested task-queries may be provided to a user via audio output. Output of the task-queries to a user may occur as described with respect to embodiments of presentation component 220 and/or task-query suggestion interface 292.

Prior to providing the suggested task-queries to a user, method 600 may further include, in some embodiments, ranking or ordering the generated task-queries. For instance, in one embodiment, the task-queries are ranked according to one or more confidence scores, such as a task-intent confidence score, an entity recognition confidence score, and/or an overall confidence score. Once ranked, only a top threshold number (e.g., top two or three) task-queries are suggested to the user to prevent the suggested queries from taking up too much visual real estate and/or to reduce the processing power needed to output all possible candidate task-queries.

Figure 7:
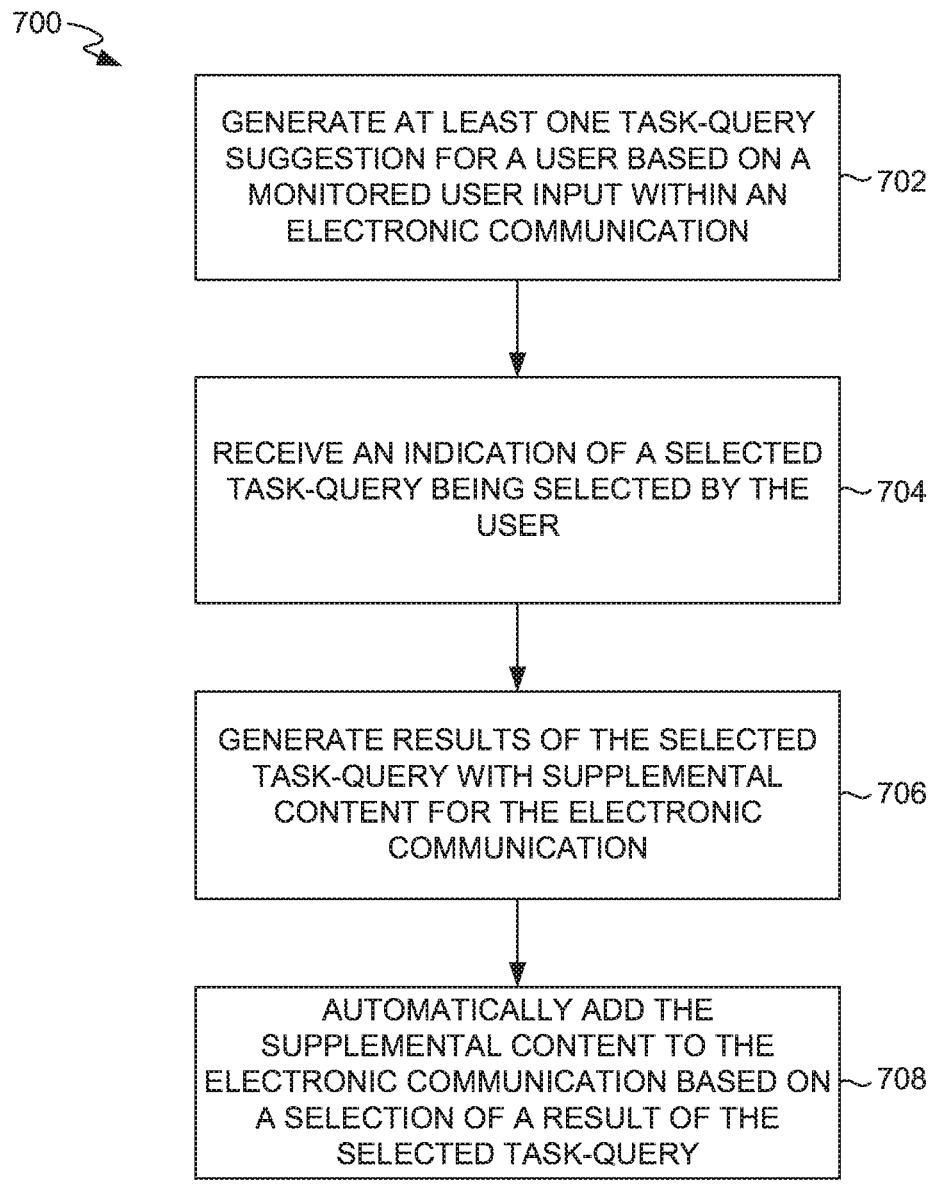

With reference to FIG. 7, a method 700 for enriching content through suggested task-queries based on user-input content is provided. At block 702, at least one task-query suggestion is generated based on observed user input in an electronic message created within a client application, such as communication application 290 of FIG. 2. Each task-query suggestion may be associated with a task for enriching content of the electronic communication. As such, in exemplary embodiments, generating one or more task-query suggestions may include observing user-input content, detecting one or more task-intents based on observed content, identifying candidate task-queries associated with each detected task-intent, and extracting entities for combining with candidate task-queries. One or more of these steps may be performed in accordance with embodiments of method 600 of FIG. 6. The generated task-queries may be suggested to the user via visual or audio output as described with respect to presentation component 220 and/or task-query suggestion interface 292.

At block 704, an indication of a selected task-query is received. The selected task-query may be selected by the user from the one or more task-queries suggested. Some embodiments of method 700 do not include block 704, and a task-query is automatically selected for generation of task-query results rather than being selected by the user. For example, in some embodiments, a predefined confidence score threshold may be used to determine whether to automatically initiate a digital conversational assistant without further selection by the user. The confidence score of a generated task-query may be compared to the predefined confidence score threshold, and initiation of a digital assistant service (such as a conversational assistant) may be automatically initiated if the generated task-query satisfies (e.g., meets or exceeds) the threshold score.

At block 706, results of the selected task-query may be generated with supplemental content for the electronic communication. Generating the results of the selected task-query may first include identifying a set of logic (which may be in the form of computer executable instructions) for executing the selected task-query (e.g., performing the associated task through performing a local search, performing a web search, creating a calendar event, and the like). Embodiments of this step may be performed as described with response to embodiments of task-response generator 276 of FIG. 2.

Results of the selected task-query (e.g., search results for a selected search-base task-query) may each be generated as objects of supplemental content for the electronic communication and formatted to be readily useable by the client application through which the user is composing the electronic communication. In exemplary embodiments, each task-response comprises an adaptive card to be readily useable by the client application. Each adaptive card may include a payload containing rendering information, follow-up action information and raw data (e.g., raw data such as the actual files found in a search). In alternative embodiments, rather than an adaptive card, the platform of the client application may be identified, and the results may be formatted for the identified platform.

Method 700 further includes, at block 708, automatically adding the supplemental content of a result to an electronic communication based on a selection of the result of the task-query. Receiving a selection of the result of the task-query may include a selection between multiple results provided to a user or confirmation of a single returned result. Automatically adding supplemental content in accordance with the selected result may include determining a set of actions needed to perform the task associated with the result, which may depend on the platform of the client communication, as further description with respect to embodiments of action determiner 278 of FIG. 2. Further, the actions may be carried out by a digital assistance (e.g., conversational assistant) service, the client application, or one or more other services or applications as described further with respect to action handler 294. In exemplary embodiments, after the actions are performed in accordance with the selected result of the task-query, the electronic communication may be enriched with additional content, such as attachment of a file, creation of a calendar invitation or meeting, inserting an object such as an image, video, or hyperlink with the body of the electronic communication.

In exemplary embodiments, a conversational assistant session with a user interface may be initiated with one or more of the steps of methods 600 and/or 700. For example, in embodiments of FIG. 7, upon receiving an indication of a selected task-query, a session with a conversational assistant may be automatically initiated, which may include loading a user interface for an interaction (e.g., a dialog) between the user and the conversational assistant. A user interface may be provided to facilitate confirmation, modification and/or execution of a task-query. Examples of user interface initiated through embodiments of the conversational assistant are further described with respect to conversational assistant interface 271 and depicted in FIGS. 4A-C and 5A-D.

Accordingly, various aspects of technology directed to systems and methods for enriching user-composed electronic communication content are provided. It is understood that various features, sub-combinations, and modifications of the embodiments described herein are of utility and may be employed in other embodiments without reference to other features or sub-combinations. Moreover, the order and sequences of steps shown in the example methods 600 and 700 are not meant to limit the scope of the present disclosure in any way, and in fact, the steps may occur in a variety of different sequences within embodiments hereof. Such variations and combinations thereof are also contemplated to be within the scope of embodiments of this disclosure.

Figure 8:
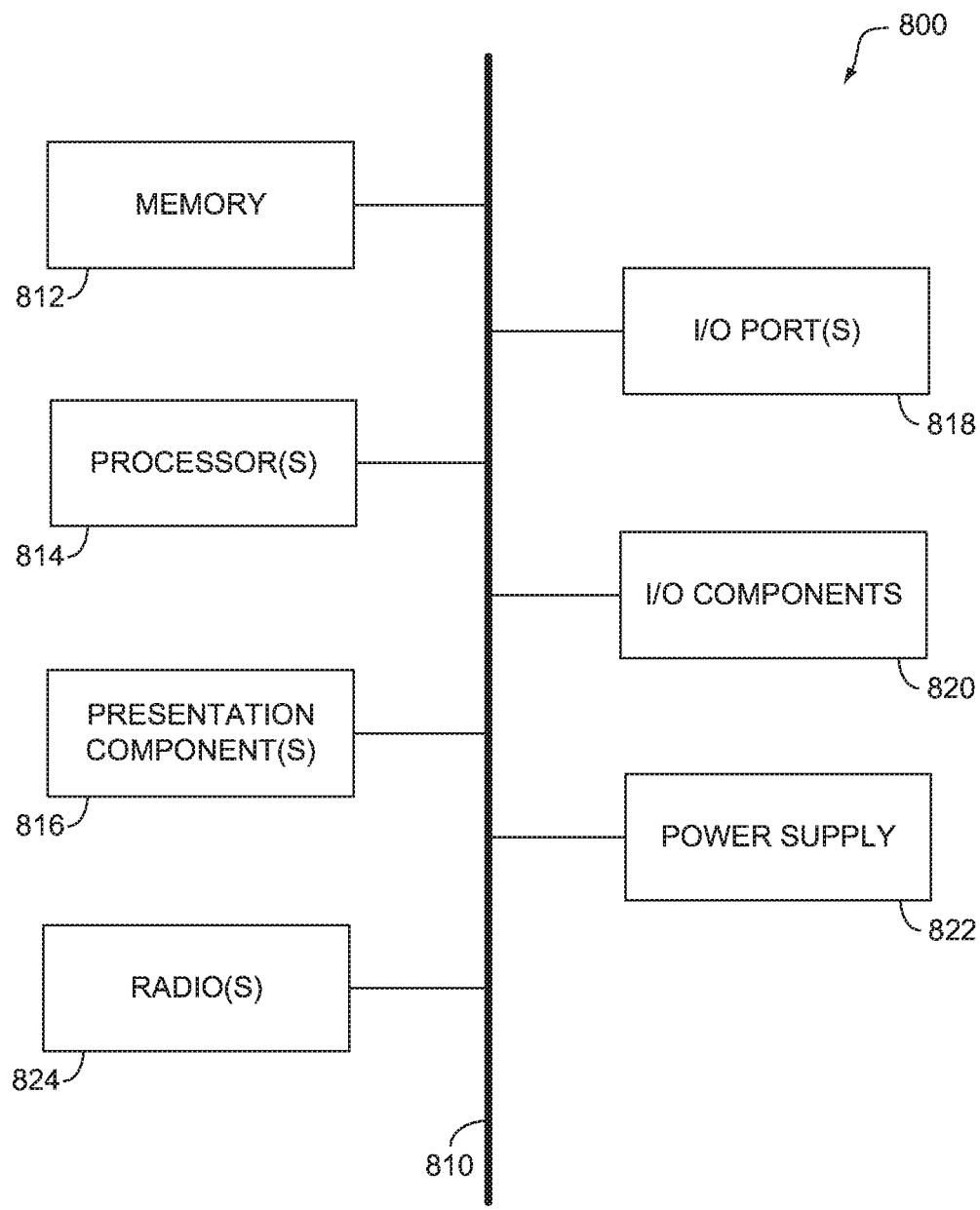
FIG. 8 is a block diagram of an exemplary computing environment suitable for use in implementing an embodiment of the present disclosure.

Having described various implementations, an exemplary computing environment suitable for implementing embodiments of the disclosure is now described. With reference to FIG. 8, an exemplary computing device is provided and referred to generally as computing device 800. The computing device 800 is but one example of a suitable computing environment and is not intended to suggest any limitation as to the scope of use or functionality of embodiments of the disclosure. Neither should the computing device 800 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, or more specialty computing devices. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 8, computing device 800 includes a bus 810 that directly or indirectly couples the following devices: memory 812, one or more processors 814, one or more presentation components 816, one or more input/output (I/O) ports 818, one or more I/O components 820, and an illustrative power supply 822. Bus 810 represents what may be one or more busses (such as an address bus, data bus, or combination thereof). Although the various blocks of FIG. 8 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 8 is merely illustrative of an exemplary computing device that can be used in connection with one or more embodiments of the present disclosure. Distinction is not made between such categories as "workstation," "server," "laptop," or "handheld device," as all are contemplated within the scope of FIG. 8 and with reference to "computing device."

Computing device 800 typically includes a variety of computer-readable media. Computer-readable media can be any available media that can be accessed by computing device 800 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include for example solid-state memory, hard drives, and optical-disc drives. Computing device 800 includes one or more processors 814 that read data from various entities such as memory 812 or I/O components 820. Presentation component(s) 816 presents data indications to a user or other device. Exemplary presentation components include a display device, speaker, printing component, vibrating component, and the like.

The I/O ports 818 allow computing device 800 to be logically coupled to other devices, including I/O components 820, some of which may be built in. Illustrative components include a microphone, joystick, game pad, satellite dish, scanner, printer, or a wireless device. The I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as stereoscopic camera systems, infrared camera systems, RGB camera systems, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

Some embodiments of computing device 800 may include one or more radio(s) 724 (or similar wireless communication components). The radio transmits and receives radio or wireless communications. The computing device 800 may be a wireless terminal adapted to receive communications and media over various wireless networks. Computing device 800 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A system for generating content for an electronic communication, the system comprising:
    a sensor configured for observing user activity on a computing device;
    a processor; and
    computer memory having computer executable instructions stored thereon for performing operations when executed by the processor, the operations comprising:
        observing, using the sensor, user-input content within the electronic communication;
        detecting a task-intent from the user-input content, the task-intent being associated with a task for enriching the electronic communication with supplemental content, the task-intent being detected utilizing a first model within a set of machine-learning models configured to detect a plurality of task intents, each model within the set of machine-learning models configured to detect a single task-intent that is different than the task-intents determined by other models within the set of machine-learning models;
        determining a set of candidate task-queries associated with the task-intent detected, at least a subset of candidate task-queries each having at least one field for an entity type associated with the task-intent;
        determining an entity of the entity type for at least one candidate task-query within the set of candidate task-queries based on the user-input content;
        generating at least one task-query suggestion based on the subset of candidate task-queries and the determined entity, each task-query suggestion corresponding to a set of operations to be carried out by a digital assistant service to facilitate enriching the electronic communication with the supplemental content;
        providing the at least one task-query suggestion for output to a user;
        receiving an indication of a first task-query selected by a user from the at least one task-query suggestion; and
        generating a set of selectable search results for the first task-query, each selectable search result comprising an object of supplemental content that is responsive to the first task-query.

2. The system of claim 1, wherein the set of candidate task-queries comprises historical task-queries previously determined to be associated with the task-intent.

3. The system of claim 1, wherein determining the entity for at least one candidate task-query is performed utilizing a user-knowledge database specific to the user inputting the user-input content.

4. The system of claim 3, wherein the user-knowledge database comprises a knowledge graph including interlinked indications of entities associated with the user and wherein determining the entity by utilizing the knowledge graph includes traversing the knowledge graph according to at least one parameter identified from the user-input content.

5. The system of claim 1, further comprising receiving an indication of a first task-query selected by a user from the at least one task-query suggestion and generating at least one result for the first task-query, each result comprising an object of supplemental content that is responsive to the first task-query.

6. The system of claim 5, wherein the first task-query corresponds to a search task operation, the entity for the first task-query is utilized as a parameter of a search associated with the search task operation, and the at least one result includes a search result.

7. The system of claim 1, wherein the operations further comprise observing user-activity indicating contextual information related to the electronic communication, and wherein determining the entity for at least one candidate task-query further includes utilizing the contextual information.

8. A computerized method of generating content for an electronic communication, the computerized method comprising:
    detecting a task-intent from user-input content within the electronic communication in a client application, the task-intent being associated with a task for enriching the electronic communication with supplemental content, the task-intent being detected utilizing a first model within a set of machine-learning models configured to detect a plurality of task intents, each model within the set of machine-learning models configured to detect a single task-intent that is different than the task-intents determined by other models within the set of machine-learning models;

determining a set of candidate task-queries associated with the task-intent detected, at least a subset of candidate task-queries each having at least one field for an entity type associated with the task-intent;

determining an entity of the entity type for at least one candidate task-query within the set of candidate task-queries based on the user-input content;

generating at least one task-query suggestion based on the subset of candidate task-queries and the determined entity, each task-query suggestion being associated with a task for enriching content of the electronic communication;

receiving an indication of a selected task-query selected by a user from the at least one task-query suggestion;

generating a set of selectable search results for the selected task-query, wherein each selectable search result generated includes supplemental content for the electronic communication that is responsive to the selected task-query and is formatted to be usable by the client application; and automatically adding the supplemental content to the electronic communication based on a selection of a selectable search result of the selected task-query.

9. The computerized method of claim 8, wherein each selectable search result of the selected task-query comprises an adaptive card that includes raw content data and rendering information for displaying the raw content data, the adaptive card being usable with a plurality of platforms for the client application.

10. The computerized method of claim 8, wherein generating results of the selected task-query comprises identifying a platform for the client application and formatting the supplemental content of each result consistent with the platform identified.

11. The computerized method of claim 8, wherein receiving the indication of the selected task-query automatically initiates a session with a conversational assistant by loading a user interface for a dialog between the conversational assistant and the user, and providing an indication of the selected task-query to the conversational assistant.

12. A computerized method for generating a graphical user interface for a computing device, the method comprising:

observing user content input into an electronic communication within a client application;

detecting a task-intent from the user content input, the task-intent being associated with a task for enriching the electronic communication with supplemental content, the task-intent being detected utilizing a first model within a set of machine-learning models configured to detect a plurality of task intents, each model within the set of machine-learning models configured to detect a single task-intent that is different than the task-intents determined by other models within the set of machine-learning models;

determining a set of candidate task-queries associated with the task-intent detected, at least a subset of candidate task-queries each having at least one field for an entity type associated with the task-intent;

determining an entity of the entity type for at least one candidate task-query within the set of candidate task-queries based on the user content input;

generating at least one task-query suggestion based on the subset of candidate task-queries and the determined entity, each task-query suggestion being associated with a task for enriching the electronic communication with supplemental content;

receiving, from a user, a selection of a first task-query from the at least one task-query suggestion;

generating a set of selectable search results for the first task-query, each selectable search result comprising an object of supplemental content that is responsive to the first task-query; and automatically initiating a conversational assistant user interface for creating a dialog between a conversational assistant and the user to complete the task associated with the selected first task-query.

13. The computerized method of claim 12, wherein the conversational assistant user interface comprises the set of selectable search results for the first task-query, each selectable search result comprising an object of supplemental content that is formatted to be utilized by the client application.

14. The computerized method of claim 12, wherein automatically initiating the conversational assistant user interface comprises requesting user input for information about one or more entities that are not determined by utilizing the user-knowledge database.

15. The computerized method of claim 12, wherein generating the at least one task-query suggestion comprises generating at least two task-query suggestions associated with different tasks, and wherein the computerized method further comprises contemporaneously providing the at least two task-query suggestions to the user for selection, and the at least two task-query suggestions provided to the user are associated with different types tasks for adding supplemental content.

* * * * *